United States Patent
Chun et al.

(10) Patent No.: US 11,510,095 B2
(45) Date of Patent: Nov. 22, 2022

(54) METHOD FOR TRANSMITTING OR RECEIVING FRAME IN WIRELESS LAN SYSTEM AND APPARATUS THEREFOR

(71) Applicant: LG ELECTRONICS INC., Seoul (KR)

(72) Inventors: Jinyoung Chun, Seoul (KR); Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 16/979,508

(22) PCT Filed: Jun. 27, 2018

(86) PCT No.: PCT/KR2018/007276
§ 371 (c)(1),
(2) Date: Sep. 9, 2020

(87) PCT Pub. No.: WO2019/190000
PCT Pub. Date: Oct. 3, 2019

(65) Prior Publication Data
US 2021/0045009 A1 Feb. 11, 2021

(30) Foreign Application Priority Data

Mar. 26, 2018 (KR) .......... 10-2018-0034739
Mar. 26, 2018 (KR) .......... 10-2018-0034748

(51) Int. Cl.
*H04W 28/04* (2009.01)
*H04L 1/00* (2006.01)
(Continued)

(52) U.S. Cl.
CPC .......... *H04W 28/04* (2013.01); *H04L 1/0061* (2013.01); *H04L 1/1812* (2013.01); *H04W 84/12* (2013.01)

(58) Field of Classification Search
CPC .... H04L 1/0061; H04L 1/1812; H04W 28/04; H04W 84/12
(Continued)

(56) References Cited

U.S. PATENT DOCUMENTS

2012/0054584 A1* 3/2012 Roh .................... H03M 13/152
714/776
2015/0071276 A1  3/2015 Kim et al.
(Continued)

FOREIGN PATENT DOCUMENTS

KR    20160125992    11/2016
KR    101703107     2/2017
(Continued)

OTHER PUBLICATIONS

PCT International Application No. PCT/KR2018/007276, International Search Report dated Dec. 19, 2018, 2 pages.

*Primary Examiner* — Rownak Islam
(74) *Attorney, Agent, or Firm* — Lee Hong Degerman Kang Waimey

(57) ABSTRACT

A method for transmitting or receiving a frame by a STA in a WLAN according to one embodiment of the present invention may comprise the steps of: receiving a first frame including a PHY header and an A-PHDU obtained by aggregating PHDUs which are PHY data transmission units for a HARQ process; decoding at least one PHDU for the STA in the A-PHDU on the basis of the PHY header; and transmitting a second frame including ACK/NACK information on each of the at least one PHDU for the STA, according to a decoding result, wherein a CRC is individually provided to each of the PHDUs included in the
(Continued)

A-PHDU, and the STA transmits a NACK through the second frame in relation to a particular PHDU for which a CRC failure has occurred during the decoding of the particular PHDU.

6 Claims, 31 Drawing Sheets

(51) Int. Cl.
 *H04L 1/18* (2006.01)
 *H04W 84/12* (2009.01)
(58) Field of Classification Search
 USPC .......................................................... 370/328
 See application file for complete search history.

(56) References Cited

U.S. PATENT DOCUMENTS

2017/0230149 A1 8/2017 Wang et al.
2020/0396025 A1* 12/2020 Sun ....................... H04L 1/1685

FOREIGN PATENT DOCUMENTS

KR 101742909 6/2017
WO WO-2019132981 A1 * 7/2019 ........... H04L 1/1835

* cited by examiner (a)

| Training symbols | PHY header A | A-PHDU |

| HARQ-STF | PHY header | HARQ-LTF for A-PHDU subframe 1 | A-PHDU subframe 1 | HARQ-LTF for A-PHDU subframe 2 | A-PHDU subframe 2 | ... | HARQ-LTF for A-PHDU subframe n | A-PHDU subframe n |

METHOD FOR TRANSMITTING OR RECEIVING FRAME IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/007276, filed on Jun. 27, 2018, which claims the benefit of earlier filing date and right of priority to Korean Application Nos. 10-2018-0034739, filed on Mar. 26, 2018, and 10-2018-0034748, filed on Mar. 26, 2018, the contents of which are all hereby incorporated by reference herein in their entirety.

BACKGROUND

Technical Field

The present disclosure relates to frame transmission and reception in a wireless local area network and, more particularly, to a method for transmitting and receiving a frame based on an HARQ process and an apparatus therefor.

Related Art

Institute of Electrical and Electronics Engineers (IEEE) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

SUMMARY

An aspect of the present disclosure is to provide a frame configuration for transmitting and receiving a frame based on an HARQ process in a WLAN, an operation method of a physical layer, and an STA/AP device.

The disclosure is not limited to the foregoing aspect, and other aspects may be inferred from embodiments of the disclosure.

To achieve the foregoing aspect, a method for transmitting and receiving a frame by a station (STA) in a wireless local area network (WLAN) according to one embodiment of the present disclosure may include: receiving a first frame including an aggregated (A)-PHDU, obtained by aggregating PHY HARQ data units (PHDUs) as a physical-layer (PHY) data transmission unit for a hybrid automatic repeat request (HARQ) process, and a PHY header; decoding at least one PHDU for the STA in the A-PHDU based on the PHY header; and transmitting a second frame including ACK/NACK information about each of the at least one PHDU for the STA according to a decoding result, wherein a cyclic redundancy check (CRC) may be individually provided for each of the PHDUs included in the A-PHDU, and the STA may transmit, through the second frame, an NACK of a specific PHDU in which CRC failure occurs when performing the decoding.

To achieve the foregoing aspect, a station (STA) for transmitting and receiving a frame in a wireless local area network (WLAN) according to one embodiment of the present disclosure may include: a transceiver; and a processor to receive a first frame including an aggregated (A)-PHDU, obtained by aggregating PHY HARQ data units (PHDUs) as a physical-layer (PHY) data transmission unit for a hybrid automatic repeat request (HARQ) process, and a PHY header through the transceiver, to decode at least one PHDU for the STA in the A-PHDU based on the PHY header, and to transmit a second frame including ACK/NACK information about each of the at least one PHDU for the STA according to a decoding result, wherein a cyclic redundancy check (CRC) may be individually provided for each of the PHDUs included in the A-PHDU, and the processor may transmit, through the second frame, an NACK of a specific PHDU in which CRC failure occurs when performing decoding.

The STA may receive the specific PHDU which is retransmitted as a response to the NACK; and may attempt to combine and decode the specific PHDU which is initially transmitted and the specific PHDU which is retransmitted.

The specific PHDU may be retransmitted through a third frame including a new PHDU.

The position of the specific PHDU in the third frame may be configured to be the same as the position of the specific PHDU in the first frame.

The STA may transmit an ACK frame or a block ACK (BA) frame through a MAC layer after obtaining an ACK of the entirety of the at least one PHDU for the STA in a physical layer according to the HARQ process.

The PHY header may include at least one of the number of PHDUs included in the A-PHDU, an identifier of a receiving STA of each PHDU, position or size information about each PHDU, and HARQ information about each PHDU.

The HARQ information about each PHDU may include at least one of an HARQ process identifier of the PHDU, information indicating whether the PHDU is initially transmitted or is retransmitted, and incremental redundancy (IR) information about the PHDU.

The PHY header may include a first PHY header common to all of the PHDUs included in the A-PHDU and a second PHY header specific to each PHDU, the first PHY header may include the number of PHDUs included in the A-PHDU, and the second PHY header may include the identifier of the receiving STA of each PHDU, the position or size information about each PHDU, and the HARQ information about each PHDU.

The first frame may further include training symbols positioned before the PHY header and the A-PHDU, and the training symbols may be configured differently according to a number of STAs receiving the A-PHDU.

The training symbols may include an HARQ-long training field (LTF), and the HARQ-LTF may include a first HARQ-LTF for the STA and a second HARQ-LTF for a different STA.

The first HARQ-LTF and the second HARQ-LTF may be subjected to frequency-division multiplexing, and the second HARQ-LTF may be obtained by shifting the first HARQ-LTF by a specific subcarrier in a frequency domain.

The first HARQ-LTF and the second HARQ-LTF may be subjected to time-division multiplexing, the first HARQ-LTF may be configured according to the number of streams of the at least one PHDU for the STA, and the second HARQ-LTF may be configured according to the number of streams of at least one PHDU for the different STA.

Each of the PHDUs included in the A-PHDU may correspond to part of one PHY service data unit (PSDU).

According to one embodiment of the disclosure, it is possible to accurately and efficiently perform frame transmission and retransmission by newly defining a PHDU to which encoding/decoding and a CRC are individually applied in a physical layer and by performing an HARQ process in PHDUs.

In addition to the foregoing technical effect, other technical effects may be inferred from embodiments of the present disclosure.

BRIEF DESCRIPTION OF THE DRAWINGS

FIG. 24 illustrates PHY header A positioned before an A-PHDU according to an embodiment of the present disclosure.

FIG. 28 illustrates an HARQ-STF/LTF configuration in a case where an A-PHDU is transmitted to one or more STAs according to an embodiment of the present disclosure.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
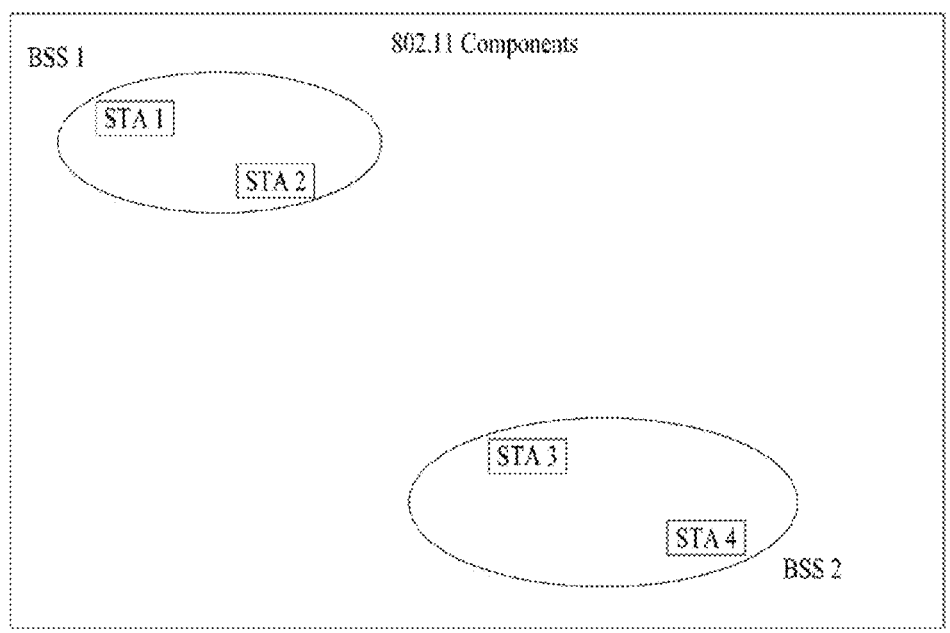
FIG. 1 illustrates an exemplary configuration of a WLAN system.

FIG. 1 illustrates an exemplary configuration of a WLAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
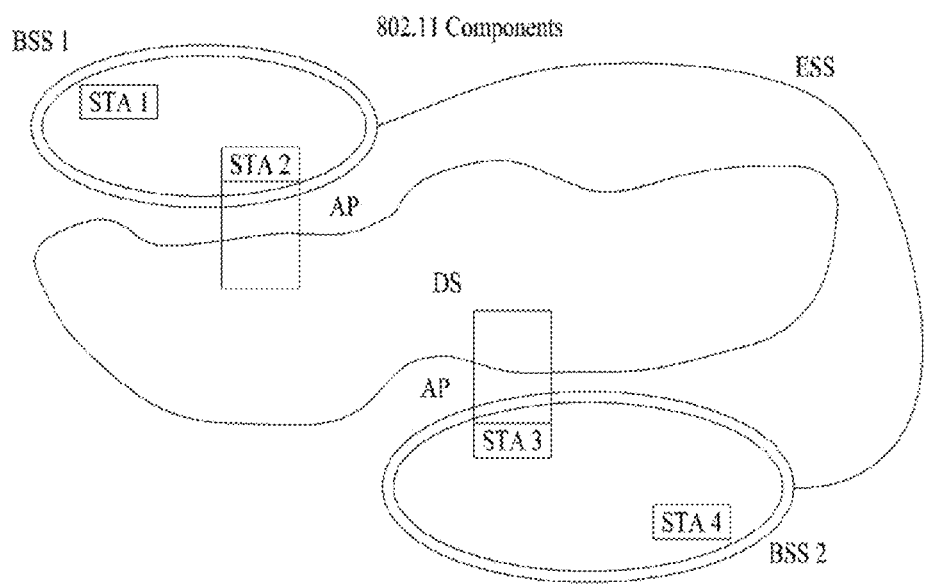
FIG. 2 illustrates another exemplary configuration of a WLAN system.

FIG. 2 illustrates another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
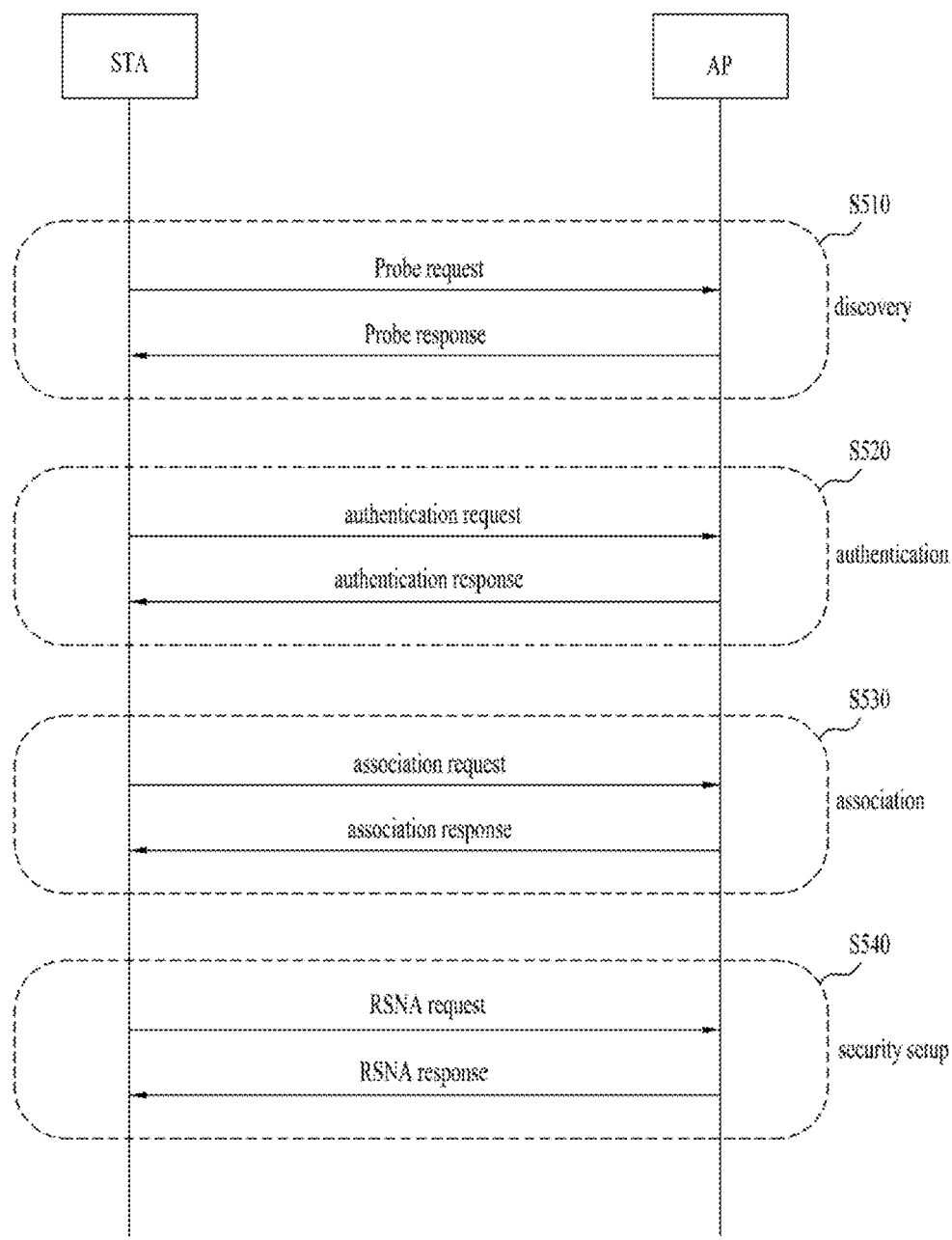
FIG. 3 illustrates a general link setup process.

FIG. 3 illustrates a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention-free period (CFP).

Figure 4:
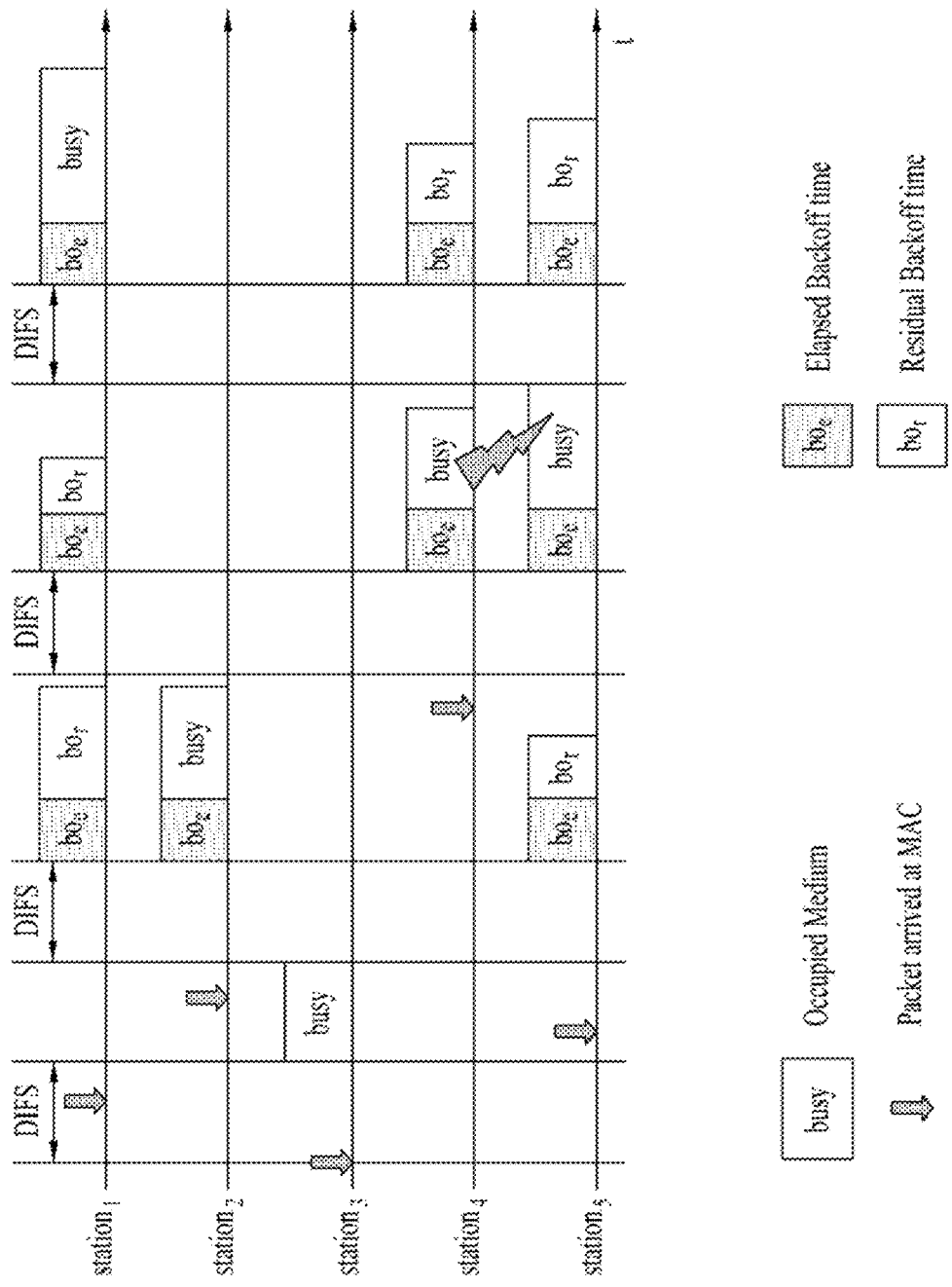
FIG. 4 illustrates a backoff process.

FIG. 4 illustrates a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
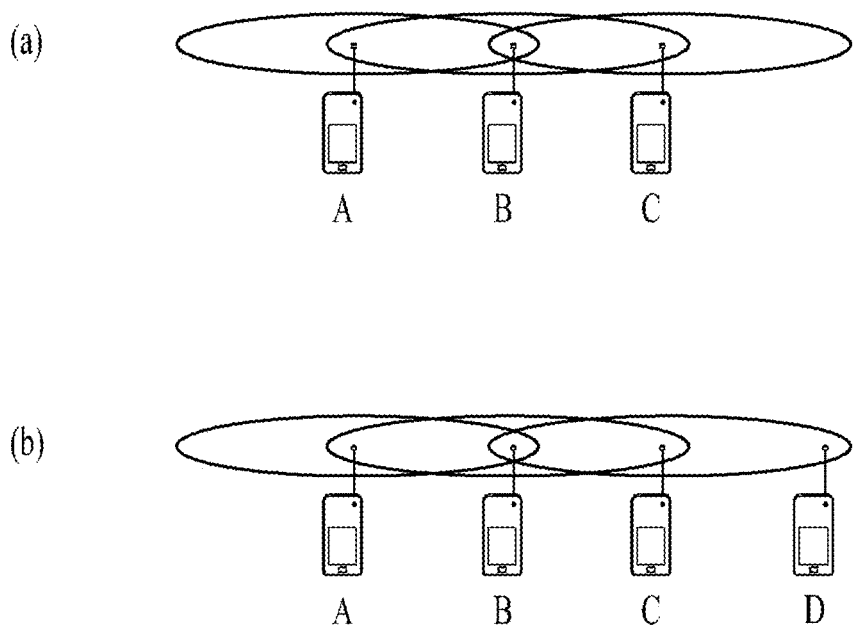
FIG. 5 illustrates a hidden node and an exposed node.

FIG. 5 illustrates a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 6:
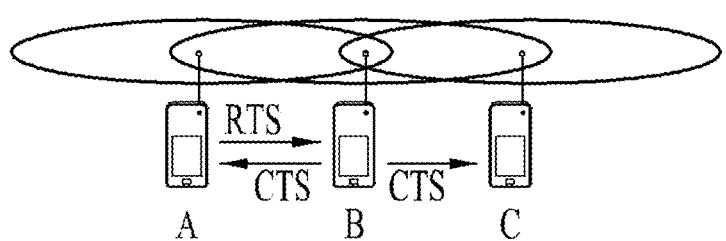
FIG. 6 illustrates RTS and CTS.
Figure 6:
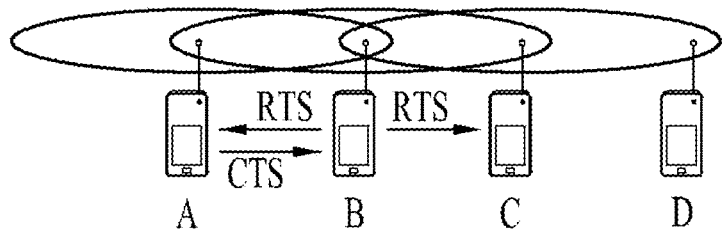

FIG. 6 illustrates RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
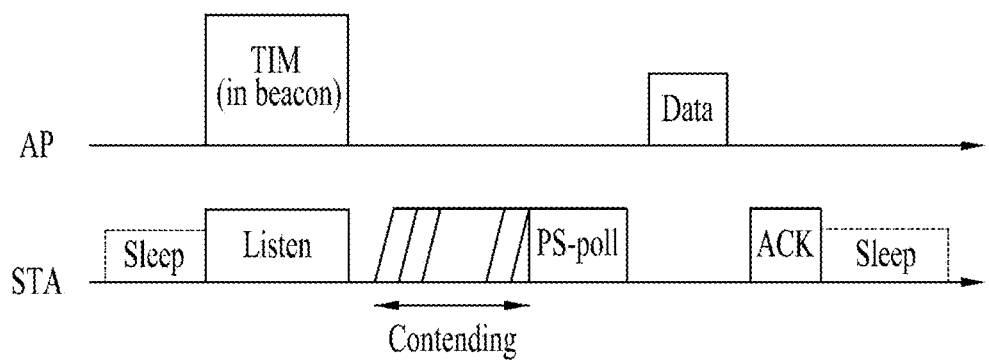
FIG. 7 to FIG. 9 illustrate an operation of an STA which receives a TIM.
Figure 8:
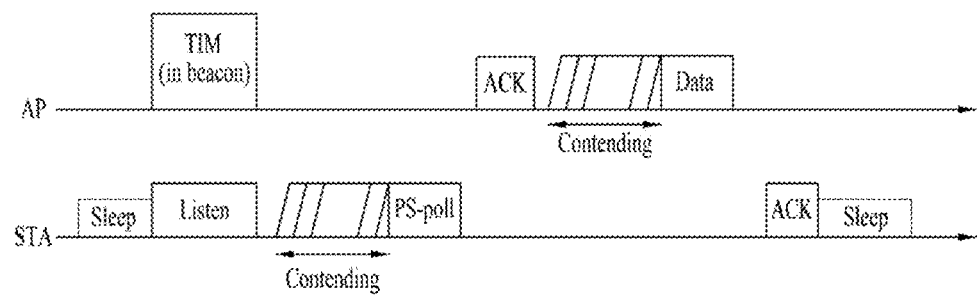
Figure 9:
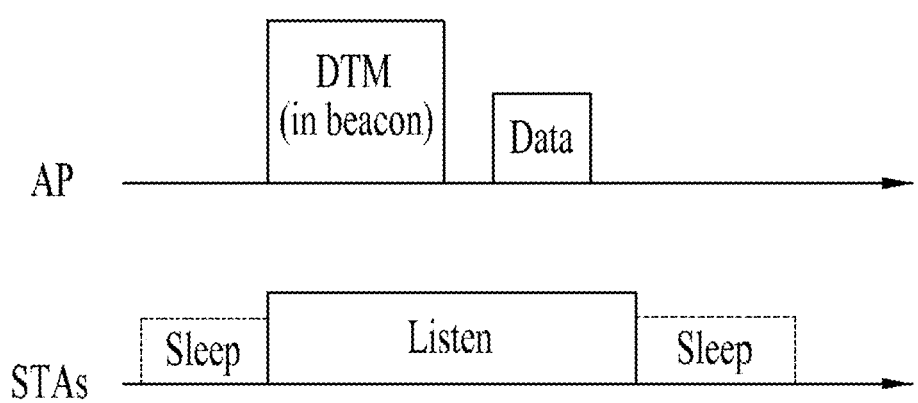

FIG. 7 to FIG. 9 illustrate an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
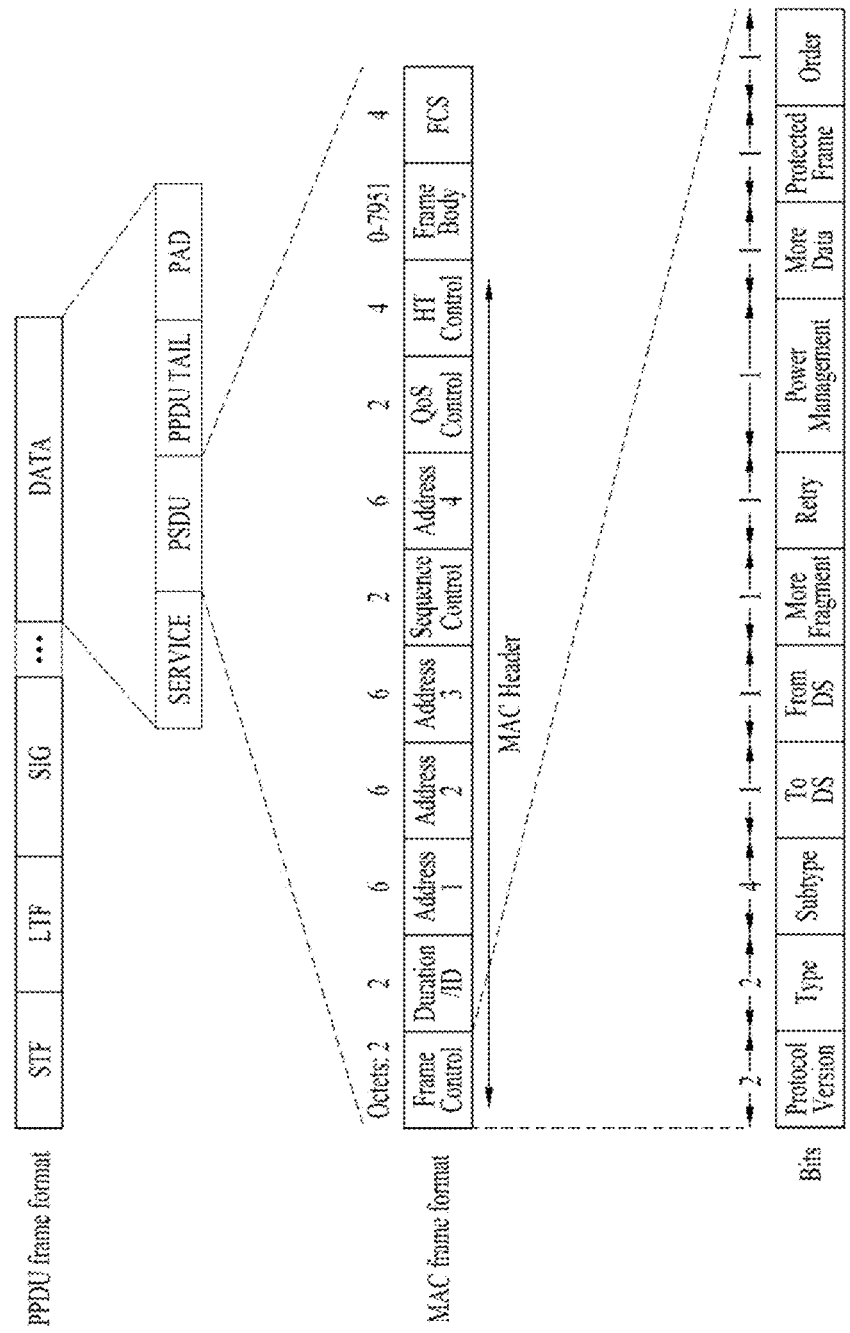
FIG. 10 illustrates an example of a frame structure used in an IEEE 802.11 system.

FIG. 10 illustrates an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention-free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (µs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

Figure 11:
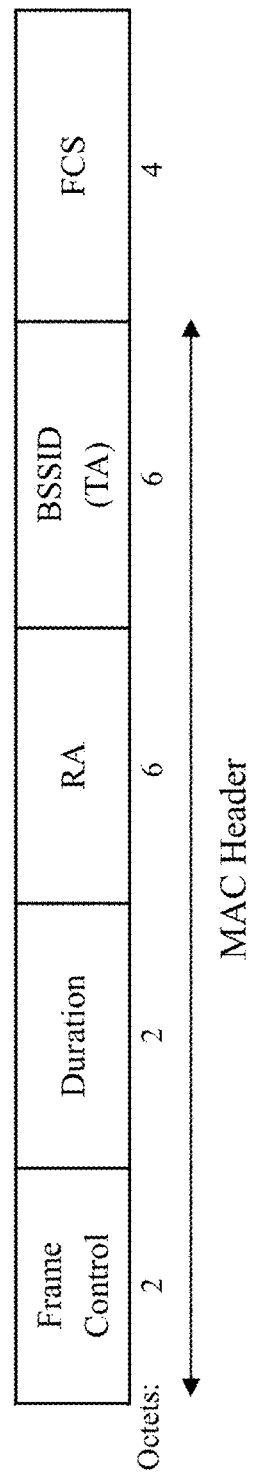
FIG. 11 illustrates a contention-free-END frame.
Figure 12:
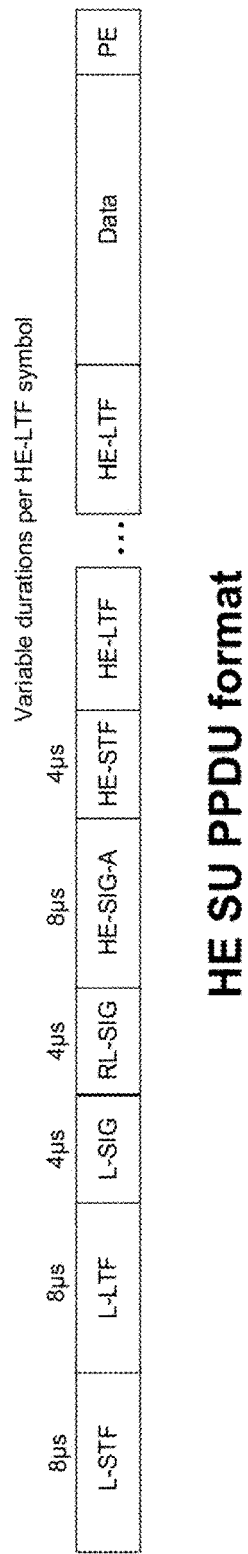
FIG. 12 to FIG. 15 illustrate HE PPDUs.
Figure 13:
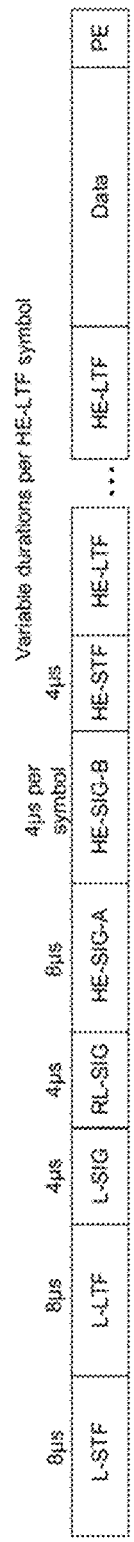
Figure 14:
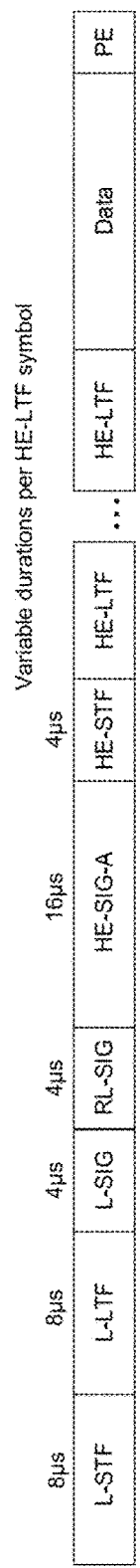
Figure 15:
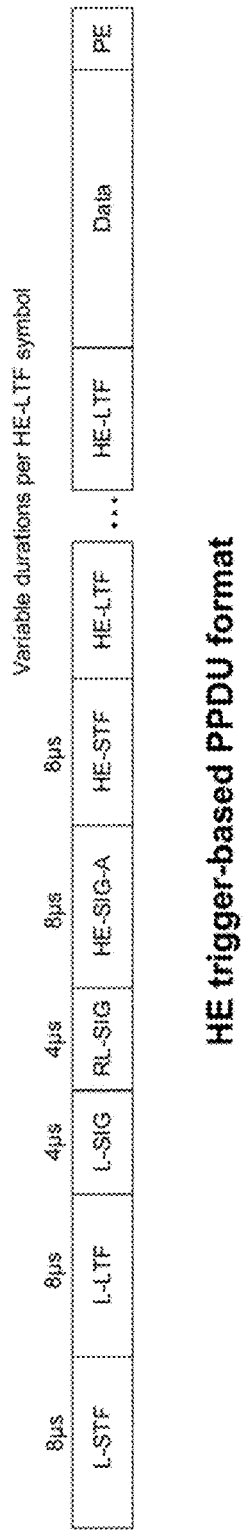

FIG. 11 illustrates a contention-free (CF) end frame.

For convenience of explanation, it is assumed that a CF end frame is transmitted by a non-directional multi-gigabit (DMG, 11ad) STA. The CF end frame may be transmitted to truncate TXOP duration. Therefore, a Duration field is set to 0 in the CF end frame. A Receiver Address (RA) field may be set to a broadcast group address. A BSSID field may be set to an address of a STA included in an AP. However, in a CF end frame in a non-HT or non-HT duplicate format transmitted by a VHT STA to a VHT AP, an Individual/Group bit of a BSSID field may be set to 1.

Example of HE PPDU Structure

Hereinafter, examples of a high-efficiency physical layer protocol data unit (HE PPDU) format in a WLAN system supporting 11ax will be described.

FIG. 12 to FIG. 15 illustrate HE PPDUs.

An HE-SIG-A field is positioned after an L-part (e.g., L-STF, L-LTF, L-SIG) and is duplicated every 20 MHz like the L-part. HE-SIG-A may be included in any HE PPDU, whereas HE-SIG-B may be omitted from a SU PPDU and a UL trigger-based PPDU (e.g., a UL PPDU transmitted based on a trigger frame).

HE-SIG-A includes common control information (e.g., a BW, a GI length, a BSS color, a CRC, a tail, and the like) for STAs. The HE-SIG-A field includes information for interpreting an HE PPDU, and thus the information included in the HE-SIG-A field may change depending on the format of the HE PPDU (e.g., a SU PPDU, a MU PPDU, a trigger-based PPDU, or the like).

For example, (i) in an HE SU PPDU format, an HE-SIG-A field may include at least one of a DL/UL indicator, an HE PPDU format indicator, a BSS color, TXOP duration, a bandwidth (BW), a MCS, a CP+LTF length, coding information, the number of streams, STBC (e.g., whether STBC is used), transmission beamforming (TxBF) information, a CRC and a tail. In the HE SU PPDU format, an HE-SIG-B field may be omitted. (ii) In an HE MU PPDU format, an HE-SIG-A field may include at least one of a DL/UL indicator, a BSS color, TXOP duration, a BW, MCS information of a SIG-B field, the number of symbols of the SIG-B field, and the number of HE LTF symbols, an indicator indicating Full-band MU-MIMO usage indicator, a CP+LTF length, transmission beamforming (TxBF) information, a CRC, and a tail. (iii) In an HE trigger-based PPDU format, an HE-SIG-A field may include at least one of a format indicator (e.g., whether a PPDU is a SU PPDU or a trigger-based PPDU), a BSS color, TXOP duration, a BW, a CRC, and a tail.

HE-SIG-A may include at least one of user allocation information, for example, an STA identifier, such as a PAID or a GID, information about an allocated resource, and the number of streams (Nsts) in addition to the foregoing common information.

BSS color information included in the HE-SIG-A field is information for identifying a BSS and has a shorter length than a BSSID. For example, while the BSSID has a length of 48 bits, the BSS color information may have a length of 6 bits. A STA may determine whether a frame is an intra-BSS frame using the BSS color information. That is, by decoding only the HE-SIG-A field without needing to decode the entire HE PPDU, the STA can distinguish an intra-BSS PPDU from an inter-BSS PPDU through the BSS color information.

HE-SIG-B may be independently encoded every 20-MHz channel. HE-SIG-B encoded every 20-MHz channel may be referred to as an HE-SIG-B content channel.

According to an embodiment, when a bandwidth is not greater than 20 MHz, one HE-SIG-B content channel may be transmitted. When a bandwidth is greater than 20 MHz, each of 20-MHz channels may transmit either a first HE-SIG-B content channel (hereinafter, HE-SIG-B [1]) or a second HE-SIG-B content channel (hereinafter, HE-SIG-B [2]). For example, HE-SIG-B [1] and HE-SIG-B [2] may be alternately transmitted. Odd-numbered 20-MHz channels may transmit HE-SIG-B [1], and even-numbered 20-MHz channels may transmit HE-SIG-B [2]. Specifically, in a 40-MHz bandwidth, HE-SIG-B [1] is transmitted on a first 20-MHz channel, and HE-SIG-B [2] is transmitted on a second 20-MHz channel. In an 80-MHz bandwidth, HE-SIG-B [1] is transmitted on a first 20-MHz channel, HE-SIG-B [2] is transmitted on a second 20-MHz channel, the same HE-SIG-B [1] is repeatedly transmitted on a third channel, and the same HE-SIG-B [2] is repeatedly transmitted on a fourth 20-MHz channel. In a 160-MHz bandwidth, transmission is performed in a similar manner.

HE-SIG-B [1] and HE-SIG-B [2] may have different contents, respectively. However, all pieces of HE-SIG-B [1] have the same content. Likewise, all pieces of HE-SIG-B [2] have the same content.

HE-SIG-B may include a common field and a user-specific field. The common field may precede the user-specific field. The common field and the user-specific field may be divided in bits rather than in OFDM symbols.

The common field of HE-SIG-B includes information about all STAs designated to receive a PPDU in the bandwidth. The common field may include resource unit (RU) allocation information. For example, when four 20-MHz channels forming 80 MHz are divided into [LL, LR, RL, RR], a common block for LL and RL may be included in a common field of HE-SIG-B [1], and a common block for LR and RR may be included in a common field of HE-SIG-B [2].

The user-specific field of HE-SIG-B may include a plurality of user fields, and each user field may include information specific to an individual STA designated to receive a PPDU. For example, the user field may include at least one of a STA ID, a MCS for each STA, the number of streams (Nsts), coding (e.g., an indication as to use of LDPC), a DCM indicator, and transmission beamforming information but is not limited thereto.

PHY Transmission/Reception Procedures

General PHY transmission/reception procedures in a WLAN are described.

According to a PHY transmission procedure, a PHY layer converts a MAC protocol data unit (MPDU) or an aggregated MPDU (A-MPDU) received from a MAC layer into one PHY service data unit (PSDU), generates a PPDU by inserting a preamble, tail bits, and padding bits (if necessary) into the PSDU, and transmits the PPDU.

According to a PHY reception procedure, a STA/AP performs energy detection and preamble detection (e.g., L/HT/VHT/HE-preamble detection per Wi-Fi version) and obtains information about a PSDU configuration from a PHY header (e.g., L/HT/VHT/HE-SIG). Subsequently, the STA/AP reads a MAC header and data based on the information about the PSDU configuration.

Details of the PHY transmission/reception procedures according to 11n/ac/ac are defined in the IEEE 802.11a/ac/ax standards.

ACK/BA Transmission and ACK Policy

In general, a BA frame is used as a response to an A-MPDU, and an ACK frame is used as a response to an MPDU.

Figure 16:
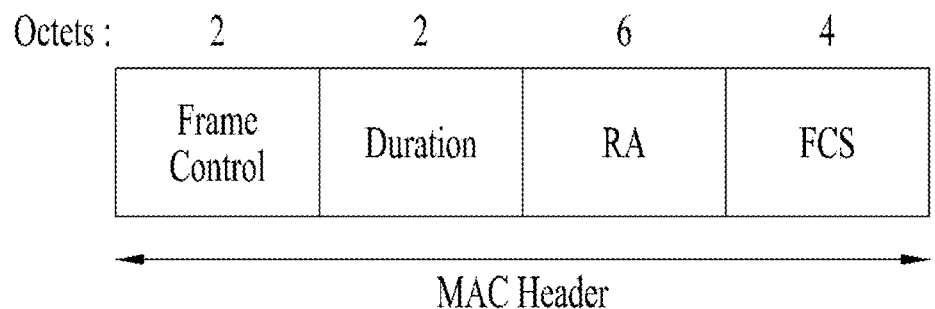
FIG. 16 illustrates an ACK frame.

FIG. 16 illustrates an ACK frame.

An RA field of the ACK frame is configured identically to an Address 2 field of a preceding frame (e.g., individually addressed data, management, BlockAckReq, BlockACK, PS-poll, and the like). When the ACK frame is transmitted by a non-QoS STA and a More Fragments bit of a Frame Control field of the preceding frame is 0, the duration of the ACK frame is set to 0. When the ACK frame is transmitted by the non-QoS STA, and the More Fragments bit of the Frame Control field of the preceding frame is not 0, the duration of the ACK frame is set to the value of a Duration/ID field of the preceding frame minus ACK transmission time+SIFS.

Table 1 shows the configuration of a BAR (BlockAckReq) frame.

TABLE 1

| MAC header of control frame | | | | |
|---|---|---|---|---|
| BAR control | 2-octet | BAR Ack policy | 1-bit | Immediate Ack/no ack |
| | | Multi-TID | 1-bit | 0x00: Basic BlockAckReq |
| | | | | 0x01: Compressed BlockAckReq |
| | | | | 0x10: Reserved |
| | | | | 0x11: Multi-TID BlockAckReq |
| | | Compressed bitmap | 1-bit | |
| | | Reserved | 9-bit | |
| | | TID_INFO | 4-bit | In Basic & Compressed, TID |
| | | | | In Multi-TID, # of TID |
| BAR information (In Basic & Compressed Block Ack) | Variable | Block Ack Starting Sequence Control | 2-octet | Fragment number (4 bits): 0x00 Start Seq Number (12 bits): of the 1st A-MSDU |
| BAR information (In Multi-TID Block Ack) | Variable | Per TID Info | 2-octet * n | Reserved: 12 bits TID value: 4 bits |
| | | Block Ack Starting Sequence Control | 2-octet * n | Fragment number (4 bits): 0x00 Start Seq Number (12 bits): of the 1st A-MSDU |
| FCS | 4-octet | | | |

Table 2 shows the configuration of a block ACK (BA) frame.

TABLE 2

| MAC header of control frame | | |
|---|---|---|
| BA control | 2-octet | Same with BAR control |
| BA information | Variable | Same with BAR information except adding Block Ack Bitmap(128/8/8*n) indicating the received status of up to 64 A-MSDUs |
| FCS | 4-octet | |

Table 3 shows the configuration of a BA/BAR ACP Policy subfield.

TABLE 3

| Value | Meaning |
|---|---|
| 0 | Normal Acknowledgment. The BA/BAR Ack Policy subfield is set to this value when the sender requires immediate acknowledgment. The addressee returns an Ack frame. The value 0 is not used for data sent under HT-delayed Block Ack/Block Ack Req during a PSMP sequence. The value 0 is not used in frames transmitted by a DMG STA. |
| 1 | No Acknowledgment. The addressee sends no immediate response upon receipt of the frame. The BA/BAR Ack Policy subfield is set to this value when the sender does not require immediate acknowledgment. |

TABLE 3-continued

| Value | Meaning |
|---|---|
| | The value 1 is not used in a Basic BlockAck/BlockAckReq frame outside a PSMP sequence. The value 1 is not used in a Multi-TID BlockAck/BlockAckReq frame. |

A QoS Control field is provided in any data frame with QoS subfield=1. Table 4 shows the configuration of the QoS Control field.

TABLE 4

| Bits in QoS Control field | | |
|---|---|---|
| Bit 5 | Bit 6 | Meaning |
| 0 | 0 | Normal Ack or Implicit BAR In a frame that is a non-A-MPDU frame or VHT single MPDU: The addressed recipient returns an Ack or QoS + CF-Ack frame after a short interframe space (SIFS) period. A non-DMG STA sets the Ack Policy subfield for individually addressed QoS Null (no data) frames to this value. |

TABLE 4-continued

| Bits in QoS Control field | | |
|---|---|---|
| Bit 5 | Bit 6 | Meaning |
| | | Otherwise:<br>The addressed recipient returns a BlockAck frame, either individually or as part of an A-MPDU starting a SIFS after the PPDU carrying the frame. |
| 1 | 0 | No Ack<br>The addressed recipient takes no action upon receipt of the frame.<br>The Ack Policy subfield is set to this value in all individually addressed frames in which the sender does not require acknowledgment. The Ack Policy subfield is also set to this value in all group addressed frames that use the QoS frame format except with a TID for which a block ack agreement exists.<br>This value of the Ack Policy subfield is not used for QoS Data frames with a TID for which a block ack agreement exists.<br>The Ack Policy subfield for group addressed QoS Null (no data) frames is set to this value. |
| 0 | 1 | No explicit acknowledge or PSMP Ack<br>When bit 6 of the Frame Control field is set to 1 (i.e. No data):<br>There may be a response frame to the frame that is received, but it is neither the Ack frame nor any Data frame of subtype + CF-Ack.<br>The Ack Policy subfield for QoS CF-Poll and QoS CF-Ack + CF-Poll Data frames is set to this value.<br>When bit 6 of the Frame Control field is set to 0:<br>The acknowledgment for a frame indicating PSMP Ack when it appears in a PSMP downlink transmission time (PSMP-DTT) is to be received in a later PSMP uplink transmission time (PSMP-UTT). The acknowledgment for a frame indicating PSMP Ack when it appears in a PSMPUTT is to be received in a later PSMP-DTT.<br>NOTE-Bit 6 of the Frame Control field indicates the absence of a data payload. When equal to 1, the QoS Data frame contains no payload, and any response is generated in response to a QoS CF-Poll or QoS CF-Ack + CF-Poll frame, but does not signify an acknowledgment of data. When set to 0, the QoS Data frame contains a payload. |
| 1 | 1 | BA<br>The addressed recipient takes no action upon the receipt of the frame except for recording the state. The recipient can expect a BlockAckReq frame in the future |

Hybrid Automatic Repeat Request (HARQ) Operation for WLAN

Although an HARQ process has not yet been introduced in a current WLAN system, the present disclosure proposes introducing the HARQ process in the WLAN system.

When the HARQ process is introduced, airtime occupied to finally transmit a frame may be reduced.

Hereinafter, airtime occupancy levels in ARQ transmission and HARQ transmission based on a current MPDU structure are simply compared.

The following basic conditions are assumed:
In A-MPDU transmission with an 80-MHz bandwidth, each MPDU is assumed to be 1500 bytes. TXOP is assumed to be up to approximately 5 ms. Since an HARQ retransmission unit is not yet defined, it is assumed that an MPDU unit is an HARQ retransmission unit for comparison between an ARQ and an HARQ.

A MCS corresponding to a packet error rate (PER) of approximately 10% is selected in the ARQ, and a MCS corresponding to a PER of approximately 30-50% is selected in consideration of retransmission in the HARQ. A MCS is selected based on a PER graph based on channel estimation including fading.

A block ACK (BA) for the ARQ is assumed to have a length of 64 us, and a physical ACK/NACK (PA) for the HARQ is assumed to have a length of 24 us. Since the PA is an undefined frame, it is assumed that the PA frame uses 20-us L-preamble+one 4-us symbol.

Comparison Analysis:
The time until transmission of corresponding MPDUs is complete including retransmission time after the A-MPDU transmission is analyzed. In this case, in the HARQ, it is assumed that a BAR and BA transmission is final transmission completion in order to complete a MAC-layer procedure.

In Table 5, MCS0&1 means that transmission is performed via MCS0 in the ARQ and transmission is performed via MCS1 in the HARQ.

Figure 17:
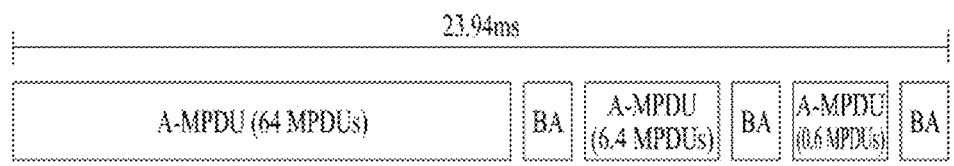
FIG. 17 illustrates a case of transmitting 64 MPDUs using an ARQ.

For example, FIG. 17 illustrates a case of transmitting 64 MPDUs using an ARQ. Referring to FIG. 17, it is assumed that a PER is 10% when MCS0 is used and 10% of the MPDUs, that is, an average of 6.4 MPDUs, are retransmitted in subsequent retransmission. Then, 0.6 MPDUs are retransmitted, after which transmission of the MPDUs is finally complete.

Figure 18:
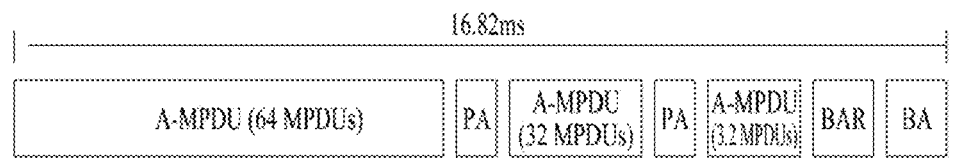
FIG. 18 illustrates a case of transmitting 64 MPDUs using an HARQ.

FIG. 18 illustrates a case of transmitting 64 MPDUs using an HARQ.

For the same SNR in an ARQ, MCS1 is used in an HARQ, in which a PER is assumed to be 50%. Therefore, 32 MPDUs are retransmitted in initial retransmission, and then 10% or 3.2 MPDUs are retransmitted by obtaining an HARQ combining gain, after which transmission of the MPDUs is finally complete.

In FIG. 17 and FIG. 18, it is assumed that the distance between frames is SIFS and that final transmission is complete within one TXOP for comparison between airtime occupancy times.

Therefore, as shown in Table 5, airtime may exceed 5 ms TXOP in a low MCS, and when the number of MPDUs is adjusted so that airtime does not exceed about 5 ms, the number of initially transmitted MPDUs is 15/30/45/64/64/64.

As a result, in a low MCS, airtime in the HARQ is less than that in the ARQ. Therefore, in a low MCS, applying the HARQ contributes to improvement in overall system performance.

TABLE 5

| | MCS0&1 | | MCS1&2 | | MCS2&3 | | MCS 3&4 | MCS 4&5 | MCS 5&6 |
|---|---|---|---|---|---|---|---|---|---|
| | 64 MPDUs | 15 MPDUs | 64 MPDUs | 30 MPDUs | 64 MPDUs | 45 MPDUs | 64 MPDUs | 64 MPDUs | 64 MPDUs |
| ARQ | 23.94 ms | 5.84 ms | 12.09 ms | 5.81 ms | 8.15 ms | 5.82 ms | 6.19 ms | 4.22 ms | 3.23 ms |
| HARQ | 16.82 ms | 4 ms | 11.32 ms | 5.47 ms | 8.58 ms | 6.13 ms | 5.83 ms | 4.44 ms | 3.36 ms |

Hereinafter, a data unit format and a training symbol required for an HARQ process are specifically proposed.

1. Data Unit Format for HAM)

Option 1

In the current WLAN system, channel coding (e.g., a convolutional code or LDPC) is applied in PSDUs. Further, a CRC for error detection is included in a delimiter or a PHY header of an A-MPDU (e.g., SIG). The channel coding and the CRC in the current WLAN are insufficient for an HARQ, because the CRC in the delimiter of the A-MPDU can be checked after a STA/AP performs decoding up to a MAC layer, and the channel coding in PSDUs may have a too large unit to be applied to the HARQ. For reference, one PSDU corresponds to up to 2304 to $2^{22}-1$ octets depending on Wi-Fi versions according to 11g/n/ac/ax.

In order to solve the foregoing problems, a basic unit of HARQ transmission is newly defined in an embodiment of the present disclosure. Although the newly defined basic unit of HARQ transmission is referred to as a physical HARQ data unit (PHDU) for convenience, the present disclosure is not limited by a term, and the term may be changed. In another example, an existing data unit (e.g., a PSDU or the like) may be redefined as a PHDU.

Figure 19:
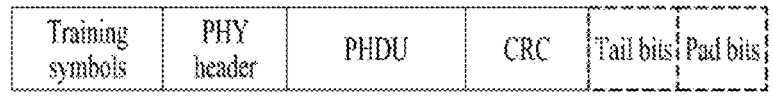
FIG. 19 illustrates PHDUs according to embodiments of the present disclosure.
Figure 19:
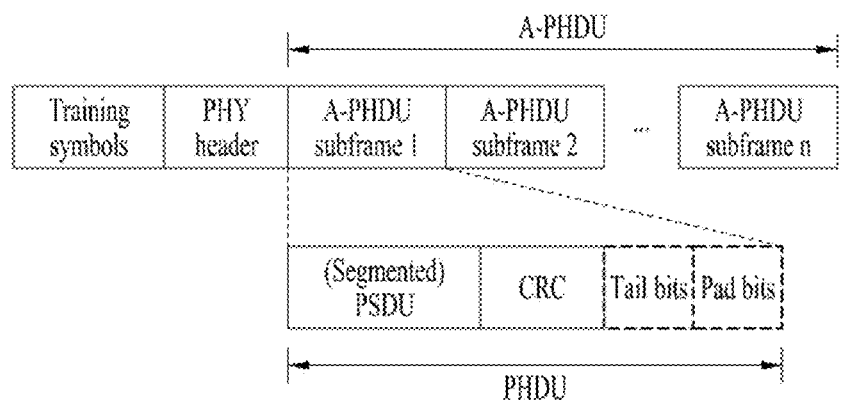
Figure 19:
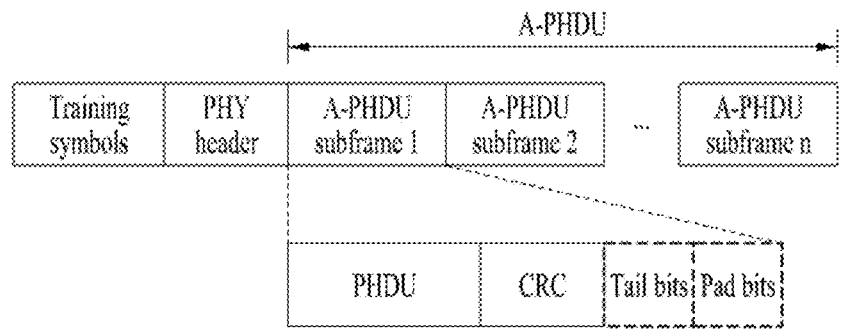

FIG. 19 illustrates PHDUs according to embodiments of the present disclosure.

Although only one PHDU may exist as shown in (a) of FIG. 19, a plurality of PHDUs may be aggregated as shown in (b)/(c) of FIG. 19, in which the aggregated PHDUs are referred to as an A-PHDU.

FIG. 19 shows training symbols and a PHY header as one block in front of a PHDU or A-PHDU, but the positions or number of training symbols/PHY headers may vary. In addition, when zero-tailed convolutional coding (e.g., convolutional coding currently supported by Wi-Fi) is used, tail bits may be added, and pad bits may be added if padding is needed.

The A-PHDU may include A-PHDU subframes. Each subframe may include a PHDU or PHDU+CRC(+tail bits+pad bits).

In an A-PHDU according to (b) of FIG. 19, a data part forming a PHDU may be the entirety or part of an existing PSDU. When the existing PSDU is entirely included in the data part, one PHDU includes one PSDU, and thus the A-PHDU may include one PHDU similarly to that in (a) of FIG. 19. Alternatively, the A-PHDU may include a plurality of PSDUs. When part of the existing PSDU is included in the data part, one existing PSDU may be divided into segments (referred to as segmented PSDUs), which may be included in respective PHDUs.

Referring to (c) of FIG. 19, a PHDU may correspond to the same unit as a PSDU or may correspond to a segmented PSDU.

Hereinafter, for convenience, an A-PHDU subframe is referred to as a PHDU. The configuration of a PHDU may be changed according to (a) to (c) of FIG. 19.

According to an embodiment of the present disclosure, unlike in a conventional art, for an HARQ, channel coding may be applied per PHDU, and a CRC may be inserted. Therefore, HARQ transmission and retransmission may be performed per PHDU.

Figure 20:
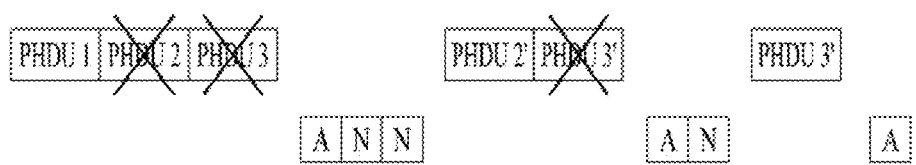
FIG. 20 illustrates an HARQ transmission and retransmission procedure performed per PHDU according to an embodiment of the present disclosure.

FIG. 20 illustrates an HARQ transmission and retransmission procedure performed per PHDU. For convenience, components other than a PHDU, an ACK (A), and a NACK (N) are not shown. Further, a format for A/N transmission is not shown, but it is assumed that an A/N is transmitted in the order of PHDUs.

When a transmitter transmits PHDU 1, PHDU 2, and PHDU 3, a receiver checks the CRCs of the received PHDUs. When the result of checking the CRCs of PHDU 2 and PHDU 3 corresponds to failure, the receiver transmits an A of PHDU 1 and an N of PHDU 2 and PHDU 3. When the transmitter properly receives A/N information, the transmitter retransmits PHDU 2 and PHDU 3.

Here, the format of a retransmitted PHDU may vary according to an HARQ scheme. For example, when chase combining (CC) is used, the transmitter may retransmit PHDU 2 and PHDU 3 as they are, and when incremental redundancy (IR) is used, the transmitter may retransmit PHDU 2' and PHDU 3' having parity bits different from PHDU 2 and PHDU 3 in the initial transmission. In FIG. 20, for convenience, a retransmitted PHDU is indicated by a PHDU'.

The receiver may receive the retransmitted PHDUs, may combine and decode the PHDUs and the previously received PHDUs, and may check the CRCs of the PHDUs. When the result of checking the CRC of PHDU 3 corresponds to failure, the receiver transmits an N, receives retransmitted PHDU 3', and then performs an HARQ operation again.

A/N transmission may be performed after SIFS from transmission of PHDUs. Retransmission may be performed after SIFS from A/N transmission, or retransmission may be performed after newly defined airtime. Alternatively, A/N transmission and retransmission may be performed at an interval of SIFS only within a TXOP period, and when the TXOP expires, the HARQ may be continuously performed based on new airtime.

Figure 21:
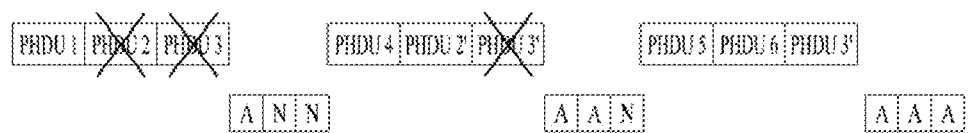
FIG. 21 illustrates an HARQ transmission and retransmission procedure performed per PHDU according to another embodiment of the present disclosure.

Although FIG. 20 shows an HARQ process for PHDU 1, PHDU 2, and PHDU 3, an HARQ process illustrated in FIG. 21 may be performed, for example, when there are more PHDUs to be transmitted. For example, a transmitter may transmit a new PHDU along with a retransmitted PHDU instead of a successfully transmitted PHDU.

In FIG. 21, the position of a retransmitted PHDU is maintained the same as that in initial transmission, and a new PHDU is disposed at the position of a successfully transmitted PHDU. In this case, a receiver knows the order of retransmitted PHDUs and can thus wait for the retransmitted PHDUs in that order. For example, PHDU 2' may be transmitted at the same position as that of PHDU 2 which has failed to be transmitted.

In another example, for convenience of the transmitter, regardless of the positions of PHDUs in previous transmission, retransmitted PHDUs may be disposed in front and new PHDUs may be disposed in back.

A/N transmission described above means an ACK/NACK in a PHY layer in response to reception of each PHDU. Therefore, a final ACK/NACK of a (A-)MPDU in a MAC layer may be transmitted as an ACK frame or a BA frame. For example, final A/N transmission in the MAC layer may be performed in addition to A/N transmission according to the HARQ process.

When the HARQ process is introduced and an existing ACK policy is applied, an ACK policy on the ACK/BA frame may be configured such that the receiver transmits the Ack/BA frame after receiving a block ACK request (BAR) frame.

Alternatively, according to a method for reducing overhead in A/N transmission, when last ACK transmission of the HARQ process corresponds to successful transmission of the last (A-)MPDU, both last ACK transmission and BAR reception in the PHY layer are omitted, and an ACK/BA frame may be transmitted immediately after SIFS. However, in this case, even though ACK information of the PHY layer, which can be shared between the PHY layer and the MAC layer, is omitted, an interaction between PHY/MAC for detecting the ACK information of the PHY layer from ACK information of the MAC layer may be defined.

Although the A-PHDU/PHDUs are simply illustrated in the above examples, an A-PHDU may be transmitted along with another A-PHDU within a band in a multi-user (MU) manner.

Figure 22:
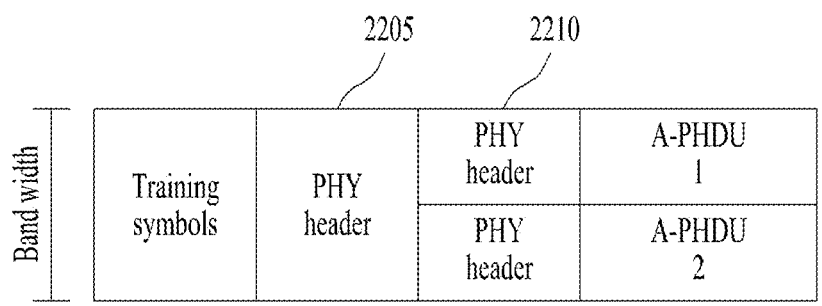
FIG. 22 illustrates an MU A-PHDU according to an embodiment of the present disclosure.
Figure 22:
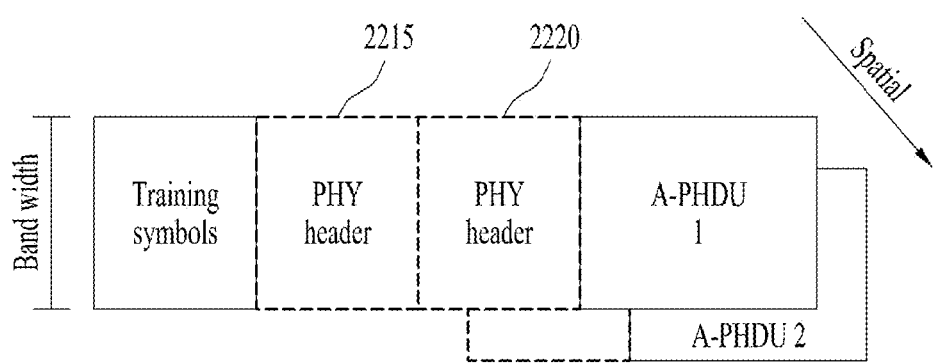

FIG. 22 illustrates an MU A-PHDU according to an embodiment of the present disclosure.

(a) of FIG. 22 shows a case where two A-PHDUs are multiplexed and transmitted in the MU manner in a frequency domain, and (b) of FIG. 22 shows a case where two A-PHDUs are multiplexed and transmitted in the MU manner in a spatial domain. (a) of FIG. 22 and (b) of FIG. 22 may be combined.

A PHY header may be divided into a header (e.g., 2205 and 2215) indicating information about an MU allocation and a configuration in the entire bandwidth and a header (e.g., 2210 and 2220) indicating information about an allocation and a configuration within each A-PHDU. However, the illustrated position and configuration of the PHY header are for illustration and may be variously changed.

Figure 23:
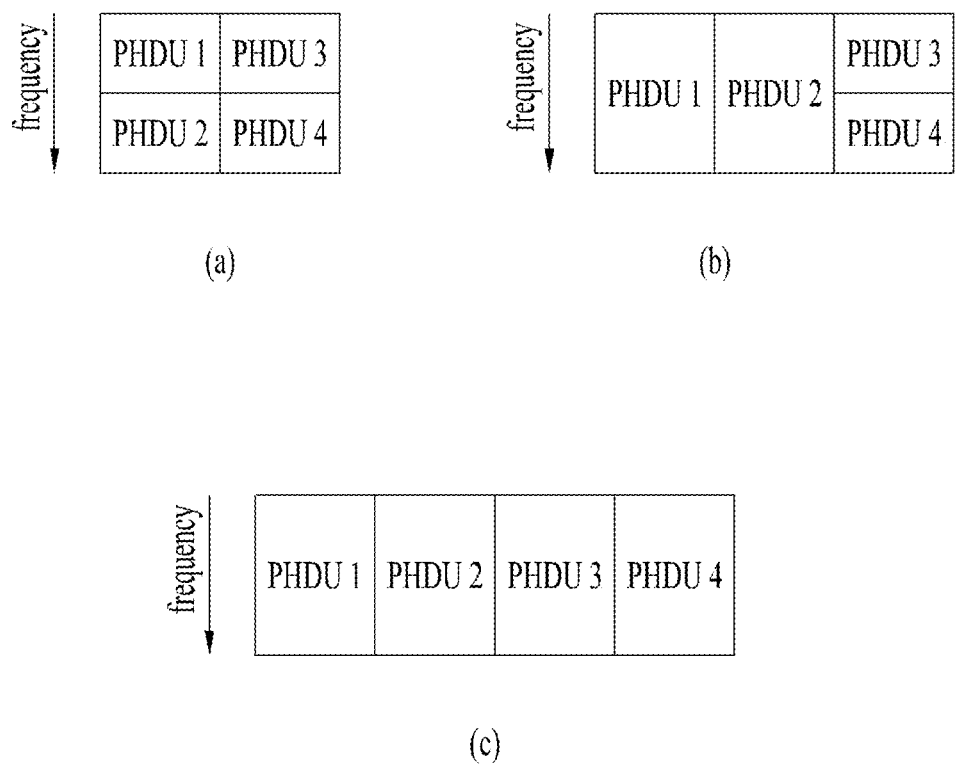
FIG. 23 illustrates examples of the configuration of a PHDU in an A-PHDU according to an embodiment of the present disclosure.

FIG. 23 illustrates examples of the configuration of a PHDU in an A-PHDU according to an embodiment of the present disclosure. As shown in FIG. 23, PHDUs in the A-PHDU may be multiplexed in time/frequency and/or spatial domains. The PHDUs in the A-PHDU may correspond to an MU or an SU.

Option 2

In order to perform an HARQ process described above, a PHY header providing information necessary for the configuration of a PHDU and an HARQ is required. For example, before decoding data, an AP/STA needs to know information about a data part to be decoded and needs to know HARQ information in order to perform an HARQ process. An existing PHY header includes information about the overall configuration of a data part, while option 2 proposes a PHY header including information about each PHDU. Since the information about each PHDU is indicated through the PHY header, channel coding, a CRC, and an HARQ may be applied to each PHDU. Further, since an STA ID is indicated early through the PHY header, each STA can determine whether to decode or skip the (A-)PHDU.

Information indicated through the PHY header is described in detail as follows.

(i) Configuration information about A-PHDU: Configuration information about the entire A-PHDU (e.g., size and position information about time/frequency/space) is needed. In particular, when a plurality of A-PHDUs is transmitted in the MU manner, information about time/frequency/space occupied by each A-PHDU is required, and this information may exist in a PHY header preceding all the A-PHDUs. In the following drawings and tables, the information may be omitted. The PHY header being positioned before [OO] may mean that a STA/AP needs to be able to read the PHY header before decoding [OO].

(ii) Information about number of PHDUs in A-PHDU: Information about the number of PHDUs in an A-PHDU indicates the number of PHDUs included in one A-PHDU. The PHY header including the information about the number of PHDUs in the A-PHDU may be positioned before the A-PHDU.

(iii) STA identifier: When each PHDU is received by a different receiving STA, the identifier of the STA may be indicated in the PHY header for decoding each PHDU. The PHY header including STA identifier information may be positioned before the A-PHDU (i.e., all PHDUs) and may indicate the IDs of all STAs at once. Alternatively, the PHY header including a STA identifier may be positioned before each PHDU in the A-PHDU. Hereinafter, a PHY header positioned before an A-PHDU is referred to as PHY header A, and a PHY header positioned before each PHDU is referred to as PHY header B.

Figure 24:
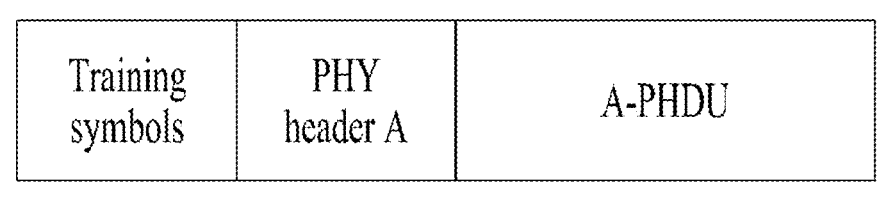

FIG. 24 illustrates an example of PHY header A positioned before an A-PHDU. Although FIG. 24 shows PHY header A as one block, a plurality of pieces of information included in PHY header A may be together subjected to encoding/decoding+CRC, or each piece of information may be subjected to encoding/decoding+CRC.

When there is a single STA to receive PHDUs in an A-PHDU, STA identifier information may be indicated only once. For example, the PHY header including STA ID information may be positioned before the A-PHDU.

Further, information indicating whether there is a single STA or a plurality of STAs to receive an A-PHDU may be provided, and this indication may be positioned before the A-PHDU. For example, PHY header A may include one-bit information (e.g., a SU/MU indicator in Table 6) indicating whether a receiving STA corresponds to a single STA or a plurality of STAs.

Figure 25:
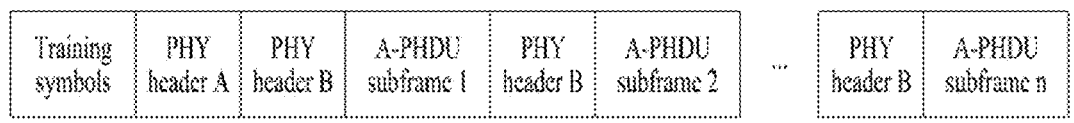
FIG. 25 illustrates PHY header A positioned before an A-PHDU and PHY header B positioned before each PHDU according to an embodiment of the present disclosure.

FIG. 25 illustrates an example of PHY header A positioned before an A-PHDU and PHY header B positioned before each PHDU. PHY header A and first PHY header B may be together subjected to encoding/decoding+CRC or may be separately subjected to encoding/decoding+CRC.

(iv) Information about index/size/position of each PHDU: The index, size, and/or position of each PHDU may be indicated by a PHY layer. For reference, in an (A-)MPDU, length information is provided via a MAC header or MPDU delimiter. However, when index/size/position information about a PHDU is provided by the PHY layer, the STA/AP may quickly determine whether retransmission is needed by checking the CRC of each PHDU.

The index of each PHDU may be a value indicating the ordinal number of the PHDU in an A-PHDU. For example, when an A-PHDU is transmitted to a plurality of STAs, each STA may identify and decode a PHDU allocated to the STA through the ordinal number of a STA ID of the STA and a PHDU index.

The size and position of each PHDU may be values indicating information about time/frequency/space for decoding the PHDU.

For example, time information about a PHDU may include a start symbol index and an end symbol index of the PHDU/number of allocated symbols. The start symbol of the A-PHDU may correspond to symbol index 0. The time information may be indicated in us instead of in symbols.

For example, frequency information about a PHDU may indicate a bandwidth used for the PHDU or may indicate RU information as in 11ax. Specifically, an RU allocation field of 11ax SIG-B may be used as frequency information. Alternatively, when a basic RU unit (e.g., 26 RUs) is defined, the frequency information may indicate a start 26-RU index and the number of 26 RUs used for the PHDU/end 26-RU index.

For example, space information about a PHDU may indicate the number of spatial streams (e.g., Nsts). Alternatively, when MU-MIMO is applied between PHDUs of an A-PHDU, space information about a PHDU may indicate a stream index/number of streams used for each PHDU. The space information may be provided as (vi) information necessary for PHDU decoding, which will be described below.

However, for a STA to decode a PHDU by identifying the size and position of the PHDU and to quickly perform a series of processes for preparing an HARQ process, index/size/position information about a PHDU may be preferably included in PHY header A.

(v) HARQ information: Information indicating whether an HARQ process is supported for each A-PHDU or each PHDU may be included in PHY header A or B. When the HARQ process is supported, the following pieces of information may be further included in PHY header A or B.

In a case where a transmitting STA/AP is performing an HARQ process for a plurality of PHDUs, information (e.g., an HARQ ID) indicating the ordinal number of a PHDU among all PHDUs subjected to the HARQ process may be included in HARQ information. For example, HARQ ID information may be needed because there may be a restriction on the number of times an HARQ process is performed, for example, only up to four HARQ processes are supported, depending on the system.

Information (e.g., Re-Tx ID) indicating whether a PHDU is initially transmitted or retransmitted and indicating the ordinal number of retransmission if the PHDU is retransmitted may be provided with respect to each PHDU. For example, Re-Tx ID=0 may denote initial transmission, and Re-Tx ID=1 may denote first retransmission.

When HARQ IR is supported, information (e.g., IR ID) about a method (e.g., a puncturing pattern or the like) used for transmission at a corresponding coding rate may be included in the HARQ information.

(vi) Information necessary for decoding each PHDU: After the STA identifies the position/size of a PHDU, information necessary for PHDU decoding may be provided. The information necessary for PHDU decoding may include, for example, a MCS, a GI+LTF size, coding, STBC, TxBF, and the like, which are included in the existing HT/VHT/HE SIG. The information necessary for PHDU decoding may be included in PHY header A or B.

Table 6 shows a case where the foregoing pieces of information (i) to (vi) are included in PHY header A.

TABLE 6

| SU/MU indication | Information indicating that the A-PHDU is transmitted to a single STA or multiple STAs: '0' indicates a single STA; '1' indicates multiple STAs |
|---|---|

TABLE 6-continued

| Number of PHDUs | Number of PHDUs included in the A-PHDU |
|---|---|
| If SU/MU indication = '0', STA ID | STA ID information about the entire A-PHDU in transmission to a single STA; |
| If SU/MU indication = '1', for (number of PHDUs) {STA ID} | pieces of STA ID information according to the order of individual PHDUs in transmission to multiple STAs |
| for (number of PHDUs) { PHDU index PHDU Size and position information HARQ information Other pieces of information necessary for decoding } | Pieces of information necessary to decode and retransmit each PHDU |
| Tail bits | When a convolutional code is used in PHY header encoding |
| CRC | |

Although it is assumed in the example of Table 6 that the pieces of information (i) to (vi) are encoded together and one CRC+tail is provided for the entire header, the pieces of information (i) to (vi) may be separately and individually encoded.

Table 7 and Table 8 show PHY header A and PHY header B when the pieces of information (i) to (vi) are divided into PHY header A and PHY header B. Tail bits and a CRC may be provided for each header.

Table 7 shows an example of PHY header A positioned before an A-PHDU.

TABLE 7

| SU/MU indication | Information indicating that the A-PHDU is transmitted to a single STA or multiple STAs: '0' indicates a single STA; '1' indicates multiple STAs |
|---|---|
| Number of PHDUs | Number of PHDUs included in the A-PHDU |
| If SU/MU indication = '0', STA ID | STA ID information about the entire A-PHDU in transmission to a single STA; |
| If SU/MU indication = '1', for (number of PHDUs) {STA ID} | pieces of STA ID information according to the order of individual PHDUs in transmission to multiple STAs |
| Tail bits | When a convolutional code is used in PHY header encoding |
| CRC | |

Table 8 shows an example of PHY header B positioned before each PHDU.

TABLE 8

| If SU/MU indication = '1', STA ID | STA ID information about a corresponding PHDU in transmission to multiple STAs (which can be omitted if included in PHY header A) |
|---|---|
| PHDU index PHDU Size and position information HARQ information Other pieces of information necessary for decoding | Pieces of information necessary to decode and retransmit each PHDU |
| Tail bits | When a convolutional code is used in PHY header encoding |
| CRC | |

According to the above description, a reception procedure of a STA/AP is briefly summarized as follows.

The STA/AP performs energy detection and preamble detection. As a result of preamble detection, when the preamble is identified as a frame in a WLAN version supporting HARQ, the STA/AP reads a PHDU and HARQ configuration information from a PHY header.

The STA/AP decodes each PHDU and check the CRC of the PHDU according to configuration information about each identified A-PHDU subframe. When decoding a retransmitted PHDU, the STA/AP may combine and decode a previously received PHDU and the retransmitted PHDU.

The STA/AP transmits an ACK in the absence of an error as a result of the CRC, and transmits an NACK in the presence of an error.

2. Training Symbols for HARQ

Next, the configuration of training symbols for an HARQ operation is proposed.

Option 3: How to Configure Training Symbols for A-PHDU

Training symbols may be configured differently when an A-PHDU is transmitted to a single STA and when an A-PHDU is transmitted to different STAs by PHDUs.

Training symbols may be divided as follows.

HARQ-STF: Training symbols for automatic gain control (AGC), timing offset estimation, and coarse frequency offset estimation for an A-PHDU are referred to as an HARQ-STF.

HARQ-LTF: Training symbols for channel estimation and fine frequency offset estimation for an A-PHDU are referred to as an HARQ-LTF.

Other training symbols before an HARQ-STF/LTF, such as an L-STF/LTF/SIG, are not described. An existing L-STF/LTF/SIG may or may not be provided depending on need to support backward compatibility.

Proposed training symbols relate to training symbols in an A-PHDU. The proposed training symbols may be applied even when an A-PHDU is subjected with a different A-PHDU/PPDU to MU-OFDMA/MIMO (e.g., FIG. 22). For example, when an A-PHDU is subjected to MU-OFDMA, the proposed training symbols may be applied within a band in which the A-PHDU exists unless specified otherwise.

Option 4-1: Method for Configuring HARQ-STF/LTF when A-PHDU is Transmitted to Single STA When an A-PHDU is transmitted to a single STA, an HARQ-STF/LTF may be configured similarly to training symbols of an existing WLAN. For example, an STF and an LTF for the entire A-PHDU may be positioned before a PHY header as shown in (b)/(c) of FIG. 19. In this case, the HARQ-LTF may be configured to enable channel estimation according to the total number of streams of the A-PHDU. For example, the HARQ-LTF may follow the configuration of an HE-STF/LTF of an HE SU PPDU or HE MU PPDU.

Figure 26:
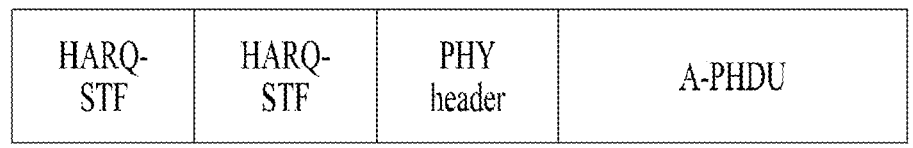
FIG. 26 illustrates an HARQ-STF/LTF in a case where an A-PHDU is transmitted to a single STA according to an embodiment of the present disclosure.

FIG. 26 illustrates an example of an HARQ-STF/LTF configuration in a case where an A-PHDU is transmitted to a single STA.

Option 4-2: Method for configuring HARQ-STF/LTF when A-PHDU is Transmitted to One or More STAs When an A-PHDU is transmitted to one or more STAs, each A-PPDU subframe or PHDU may be allocated to a different STA. In this case, each STA may require a different training symbol.

Figure 27:
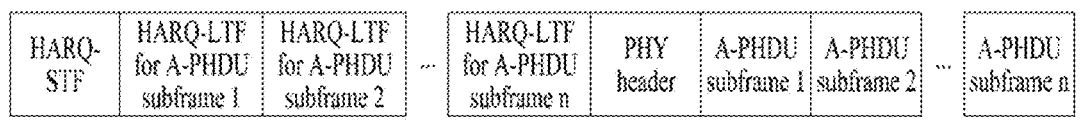
FIG. 27 illustrates an HARQ-STF/LTF configuration in a case where an A-PHDU is transmitted to one or more STAs according to an embodiment of the present disclosure.
Figure 27:
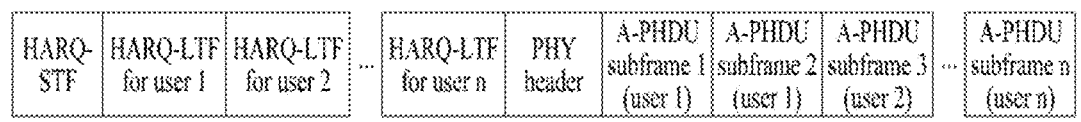

For example, since each A-PHDU subframe may require a different channel estimation value in (b)/(c) of FIG. 19, an HARQ-LTF may be provided for each A-PHDU subframe (e.g., (a) of FIG. 27). Alternatively, an HARQ-LTF may be provided for each user (e.g., (b) of FIG. 27). In this case, a STA may identify an HARQ-LTF(s) to be used by the STA through a STA ID in a PHY header.

When all A-PHDU subframes require the same channel estimation value, an HARQ-STF/LTF may be configured as in option 4-1. For example, when all subframes/users use the same number of Tx/Rx antennas and the same number of streams, as many HARQ-LTF(s) as the number of streams may be provided according to option 4-1.

In the following description, a method for configuring an HARQ-LTF in a case where all subframes/users do not use the same number of Tx/Rx antennas and the same number of streams is illustrated.

FIG. 27 illustrates an example of an HARQ-STF/LTF configuration in a case where an A-PHDU is transmitted to one or more STAs. (a) of FIG. 27 illustrates a case where an HARQ-LTF is provided for each A-PHDU subframe, and (b) of FIG. 27A illustrates a case where an HARQ-LTF is provided for each STA.

An HARQ-LTF for A-PHDU subframe k/user k (k=1, . . . , n), such as one shown in FIG. 17, is referred to as HARQ-LTF k for convenience.

HARQ-LTF k may provide channel estimation information about streams required by subframe k or user k. For example, when two/one/three streams are respectively transmitted to user 1/2/3, HARQ-LTF 1/2/3 may be configured to enable channel estimation for the two/one/three streams, respectively.

HARQ-LTFs k may be subjected to TDM or FDM.

When HARQ-LTFs k are subjected to TDM, HARQ-LTFs k may be divided and allocated on a time axis. In a specific example, assuming that an 11ax 1/2/4× HE-LTF is used as HARQ-LTF k, one 1/2/4× HE-LTF according to the number of streams may be allocated for each HARQ-LTF k. For example, assuming that n=2, A-PHDU subframe 1 uses two streams, and A-PHDU subframe 2 uses four streams (for convenience, it is assumed that STBC is not applied), HARQ-LTF 1 may be configured as a 1/2/4× HE-LTF supporting two streams, and HARQ-LTF 2 may be configured as a 1/2/4× HE-LTF supporting four streams. In addition, for example, when a 1× HE-LTF is used, the length of HARQ-LTF 1 excluding a GI is 6.4 us(=3.2 us×2), and the length of HARQ-LTF 2 is 12.8 us(=3.2 us×4). Accordingly, STA 1 may estimate a channel using HARQ-LTF 1 for A-PHDU subframe 1, and STA 2 may estimate a channel using HARQ-LTF 2 for A-PHDU subframe 2.

In another example, HARQ-LTFs k may be subjected to FDM. According to the structure of an flax 1× HE-LTF, a pilot for channel estimation is transmitted at intervals of four subcarriers, and the remaining subcarriers are emptied and transmitted. According to an embodiment of the present disclosure, when a 1× HE-LTF is used as HARQ-LTF k, a pilot for channel estimation for the next PHDU may be loaded onto remaining subcarriers according to an FDM method for HARQ-LTFs k rather than emptying the remaining subcarriers. For example, a pilot of an 11ax 1× HE-LTF is used for A-PHDU subframe 1/user 1 (e.g., Equation 1), and a pilot for A-PHDU subframe 2/user 2 may be loaded onto subsequent carriers for a pilot for A-PHDU subframe 1/user 1 (e.g., Equation 2). In this case, up to four A-PHDU subframes/users may be supported. When the number of A-PHDU subframes/users is 4 or greater, a combination of FDM and TDM may be used.

Equation 1 represents a pilot mapped to subcarrier −122 to subcarrier 122 in 20 MHz, which is configured the same as $HE\text{-}LTF_{-122,122}$.

HARQ-LTF1$_{-122,122}$ for A-PHDU subframe1/
user1={0, 0, −1, 0, 0, 0, +1, 0, 0, 0, +1, 0, 0, 0,
−1, 0, 0, 0, +1, 0, 0, 0, −1, 0, 0, 0, +1, 0, 0, 0,
+1, 0, 0, 0, +1, 0, 0, 0, +1, 0, 0, 0, −1, 0, 0, 0,
−1, 0, 0, 0, +1, 0, 0, 0, +1, 0, 0, 0, +1, 0, 0, 0,
−1, 0, 0, 0, −1, 0, 0, 0, −1, 0, 0, 0, +1, 0, 0, 0,
−1, 0, 0, 0, −1, 0, 0, 0, +1, 0, 0, 0, +1, 0, 0, 0,
−1, 0, 0, 0, −1, 0, 0, 0, +1, 0, 0, 0, −1, 0, 0, 0, $$\begin{aligned}&-1, 0, 0, 0, +1, 0, 0, 0, -1, 0, 0, 0, 0, 0, 0, 0,\\&-1, 0, 0, 0, +1, 0, 0, 0, +1, 0, 0, 0, +1, 0, 0, 0,\\&+1, 0, 0, 0, +1, 0, 0, 0, +1, 0, 0, 0, -1, 0, 0, 0,\\&-1, 0, 0, 0, -1, 0, 0, 0, -1, 0, 0, 0, -1, 0, 0, 0,\\&+1, 0, 0, 0, -1, 0, 0, 0, -1, 0, 0, 0, -1, 0, 0, 0,\\&+1, 0, 0, 0, -1, 0, 0, 0, -1, 0, 0, 0, +1, 0, 0, 0,\\&-1, 0, 0, 0, -1, 0, 0, 0, +1, 0, 0, 0, -1, 0, 0, 0,\\&+1, 0, 0, 0, -1, 0, 0, 0, -1, 0, 0, 0, -1, 0, 0, 0,\\&-1, 0, 0, 0, -1, 0, 0\} \quad \text{[Equation 1]}\end{aligned}$$

Equation 2 represents a result of shifting the pilot according to Equation 1 by one subcarrier in a frequency domain. In another example, shifting may be performed by two or three subcarriers.

$$\begin{aligned}&\text{HARQ-LTF2}_{-122,122} \text{ for A-PHDU subframe2/}\\&\text{user2} = \{0, 0, 0, -1, 0, 0, 0, +1, 0, 0, 0, +1, 0, 0,\\&0, -1, 0, 0, 0, +1, 0, 0, 0, -1, 0, 0, 0, +1, 0, 0,\\&0, +1, 0, 0, 0, +1, 0, 0, 0, +1, 0, 0, 0, -1, 0, 0,\\&0, -1, 0, 0, 0, +1, 0, 0, 0, +1, 0, 0, 0, +1, 0, 0,\\&0, -1, 0, 0, 0, -1, 0, 0, 0, -1, 0, 0, 0, +1, 0, 0,\\&0, -1, 0, 0, 0, -1, 0, 0, 0, +1, 0, 0, 0, +1, 0, 0,\\&0, -1, 0, 0, 0, -1, 0, 0, 0, +1, 0, 0, 0, -1, 0, 0,\\&0, -1, 0, 0, 0, +1, 0, 0, 0, -1, 0, 0, 0, 0, 0, 0,\\&-1, 0, 0, 0, +1, 0, 0, 0, +1, 0, 0, 0, +1, 0, 0, 0,\\&+1, 0, 0, 0, +1, 0, 0, 0, +1, 0, 0, 0, -1, 0, 0, 0,\\&-1, 0, 0, 0, -1, 0, 0, 0, -1, 0, 0, 0, -1, 0, 0, 0,\\&+1, 0, 0, 0, -1, 0, 0, 0, -1, 0, 0, 0, -1, 0, 0, 0,\\&+1, 0, 0, 0, -1, 0, 0, 0, -1, 0, 0, 0, +1, 0, 0, 0,\\&-1, 0, 0, 0, -1, 0, 0, 0, +1, 0, 0, 0, -1, 0, 0, 0,\\&+1, 0, 0, 0, -1, 0, 0, 0, -1, 0, 0, 0, -1, 0, 0, 0,\\&-1, 0, 0, 0, -1, 0\} \quad \text{[Equation 2]}\end{aligned}$$

TDM is convenient in terms of using an existing LTF as it is, while FDM reduces overhead in HARQ-LTF transmission on the time axis.

FIG. 28 illustrates another example of an HARQ-STF/LTF configuration in a case where an A-PHDU is transmitted to one or more STAs.

Although it is assumed in FIG. 27 that HARQ-LTFs are positioned before a PHY header, each HARQ-LTF may be positioned before each A-PHDU subframe for channel estimation at a position close to data as shown in FIG. 28.

When Transmit Power Control (TPC) is applied according to the state of each STA, reception power for an LTF and PHDUs transmitted to each STA may be changed. In this case, an individual STF for each STA may be transmitted, and the position of an HARQ-STF may be configured in the same manner as that for an HARQ-LTF of FIG. 27/28.

Figure 29:
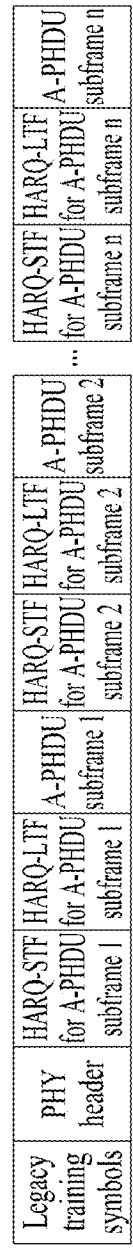
FIG. 29 illustrates a case in which an HARQ-LTF configuration format of FIG. 28 is applied to an HARQ-STF according to an embodiment of the present disclosure.

FIG. 29 illustrates a case in which an HARQ-LTF configuration format of FIG. 28 is applied to an HARQ-STF.

In FIG. 29, it is assumed that a PHY header is positioned before an HARQ-STF, in which case legacy training symbols may be provided. The position of the PHY header may be changed, and the present disclosure is not limited to the position of the PHY header.

Figure 30:
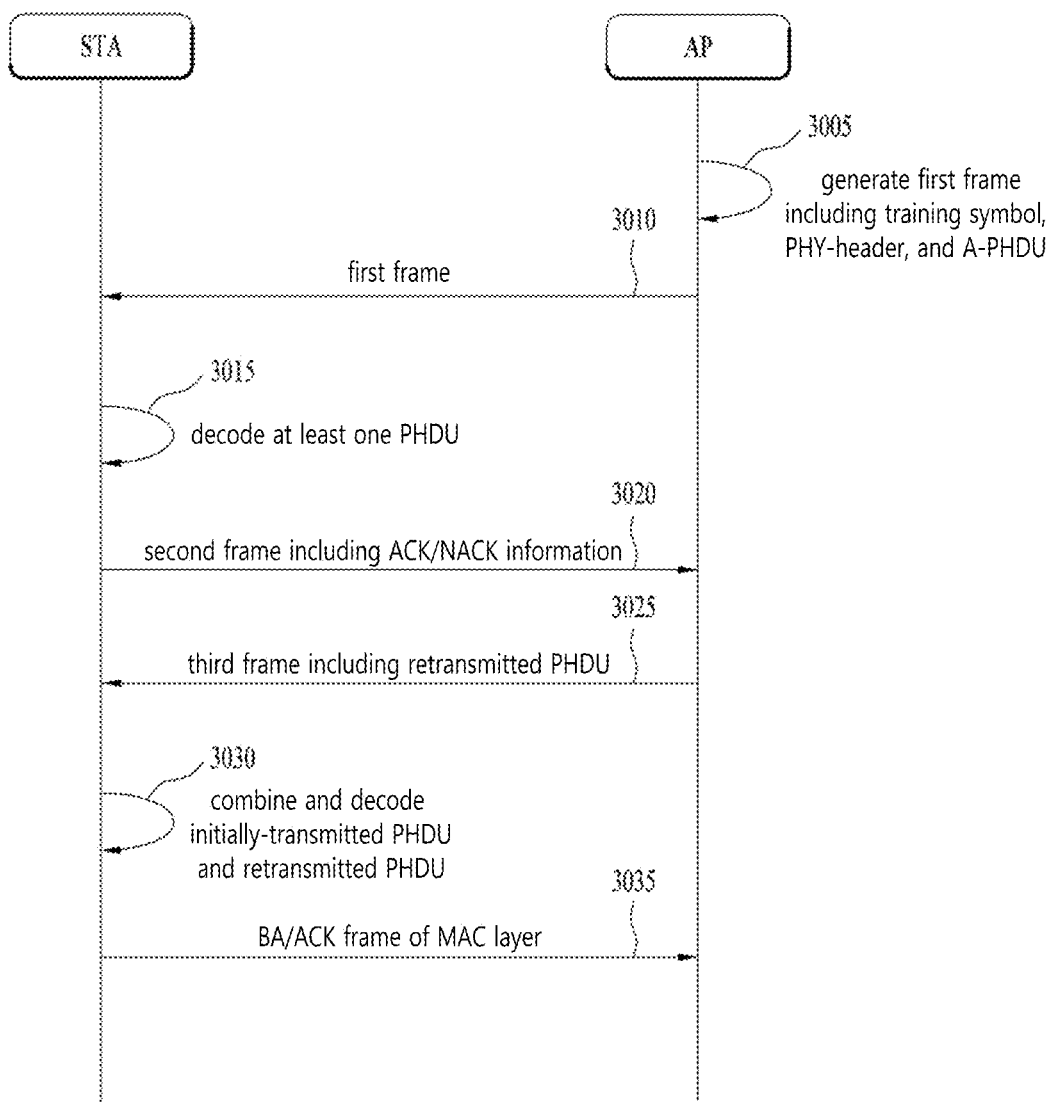
FIG. 30 illustrates the flow of a frame transmission and reception method based on an HARQ process according to an embodiment of the present disclosure.

FIG. 30 illustrates the flow of a frame transmission and reception method based on an HARQ process according to an embodiment of the present disclosure. FIG. 30 illustrates exemplary implementation of the foregoing embodiments, the present disclosure is not limited to FIG. 30, and details overlapping with those mentioned above may be omitted.

Referring to FIG. 30, an AP generates a first frame including an aggregated (A)-PHDU, obtained by aggregating PHY HARQ data units (PHDUs) as a physical-layer (PHY) data transmission unit for a hybrid automatic repeat request (HARQ) process, a PHY header, and training symbols (3005).

A STA receives the first frame from the AP (3010).

The STA attempts to decode at least one PHDU for the STA in the A-PHDU based on the PHY header (3015). A cyclic redundancy check (CRC) may be provided individually for each of the PHDUs included in the A-PHDU. The STA may check the CRC of each PHDU when performing decoding.

The STA transmits a second frame including ACK/NACK information about each of the at least one PHDU for the STA according to the decoding result (3020). The STA may transmit, through the second frame, an NACK of a specific PHDU in which CRC failure occurs when performing decoding.

The STA may receive the specific PHDU which is retransmitted as a response to the NACK through the third frame (3025). The third frame may include a new PHDU in addition to the specific PHDU which is retransmitted. The position of the specific PHDU in the third frame may be configured to be the same as the position of the specific PHDU in the first frame.

The STA may attempt to combine and decode the specific PHDU which is initially transmitted and the specific PHDU which is retransmitted (3030).

The STA may transmit an ACK frame or a block ACK (BA) frame through a MAC layer after obtaining an ACK of an entirety of the at least one PHDU for the STA in a physical layer according to the HARQ process (3035).

The PHY header may include at least one of the number of PHDUs included in the A-PHDU, the identifier of a receiving STA of each PHDU, position or size information about each PHDU, and HARQ information about each PHDU. The HARQ information about each PHDU may include at least one of the HARQ process identifier of the PHDU, information indicating whether the PHDU is initially transmitted or is retransmitted, and incremental redundancy (IR) information about the PHDU.

The PHY header may include a first PHY header common to all of the PHDUs included in the A-PHDU and a second PHY header specific to each PHDU. The first PHY header may include the number of PHDUs included in the A-PHDU. The second PHY header may include the identifier of the receiving STA of each PHDU, the position or size information about each PHDU, and the HARQ information about each PHDU.

In the first frame, the training symbols may be positioned before the PHY header and the A-PHDU. The training symbols may be configured differently according to the number of STAs receiving the A-PHDU.

The training symbols may include an HARQ-long training field (LTF). The HARQ-LTF may include a first HARQ-LTF for the STA and a second HARQ-LTF for a different STA.

The first HARQ-LTF and the second HARQ-LTF may be subjected to frequency-division multiplexing, and the second HARQ-LTF may be obtained by shifting the first HARQ-LTF by a specific subcarrier in a frequency domain.

The first HARQ-LTF and the second HARQ-LTF may be subjected to time-division multiplexing, the first HARQ-LTF may be configured according to the number of streams of the at least one PHDU for the STA, and the second HARQ-LTF may be configured according to the number of streams of at least one PHDU for the different STA.

Each of the PHDUs included in the A-PHDU may correspond to part of one PHY service data unit (PSDU).

Figure 31:
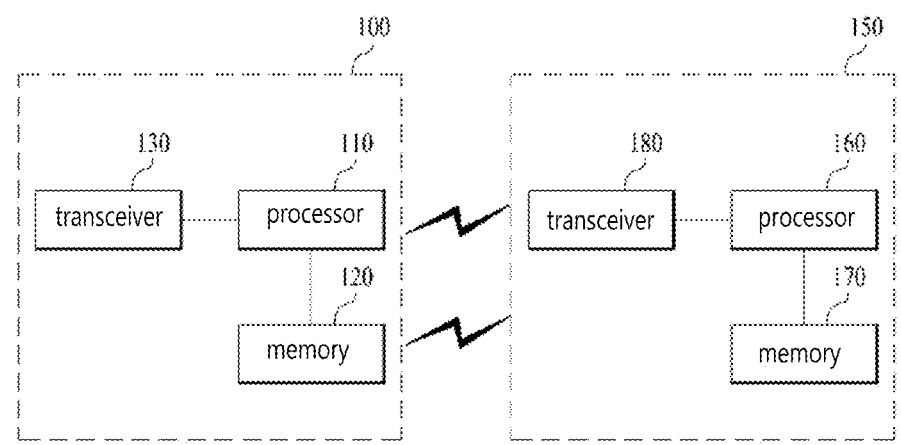
FIG. 31 illustrates a device according to an embodiment of the present disclosure.

FIG. 31 illustrates a device for implementing the foregoing method.

In FIG. 31, a wireless device 100 may correspond to a specific STA described above, and a wireless device 150 may correspond to an AP described above.

The STA 800 may include a processor 110, a memory 120, and a transceiver 130, and the AP 150 may include a processor 160, a memory 170, and a transceiver 180. The transceivers 130 and 180 transmit/receive a radio signal and may operate in a physical layer of IEEE 802.11/3GPP or the like. The processors 110 and 160 may operate in the physical layer and/or MAC layer and may be connected to the transceivers 130 and 180. The processors 110 and 160 may perform the aforementioned UL MU scheduling procedure.

The processors 110 and 160 and/or the transceivers 130 and 180 may include an application-specific integrated circuit (ASIC), a separate chipset, a logic circuit, and/or a data processor. The memories 120 and 170 may include a read-only memory (ROM), a random access memory (RAM), a flash memory, a memory card, a storage medium, and/or a separate storage unit. When one embodiment is executed by software, the foregoing methods may be implemented with a module (e.g., a processes or a functions) for performing the foregoing functions. The modules may be stored in the memories 120 and 170 and may be executed by the processors 110 and 160. The memories 120 and 170 may be disposed inside or outside the processors 110 and 160 and may be connected to the processors 110 and 160 via a well-known means.

As described above, the detailed description of the exemplary embodiments of the disclosure are provided so that those skilled in the art can implement and execute the disclosure. Although the disclosure has been described above with reference to the exemplary embodiments of the disclosure, it will be understood by those skilled in the art that diverse modifications, alterations, and variations can be made in the disclosure. Therefore, the scope and spirit of the disclosure will not be limited only to the exemplary embodiments of the disclosure set forth herein. Thus, it is intended to provide the broadest scope and spirit of the appended claims of the disclosure that are equivalent to the disclosed principles and novel characteristics of the disclosure.

INDUSTRIAL APPLICABILITY

The present disclosure is applicable to various wireless communication systems including an IEEE 802.11 system.

What is claimed is:

1. A method for transmitting and receiving a frame by a station (STA) in a wireless local area network (WLAN), the method comprising:
   receiving a first frame comprising an aggregated-physical layer hybrid protocol data unit (A-PPDU) and a physical (PHY) header, wherein the A-PPDU is configured by aggregating PPDUs, and each of the PPDUs include a data unit related to a hybrid automatic repeat request (HARQ) process,
   wherein the PHY header comprises at least one of a number of PPDUs comprised in the A-PPDU, an identifier of a receiving STA of each PPDU, and position or size information related to each PPDU, and
   wherein the PHY header further comprises at least one of an HARQ process identifier of the PPDU, information related to whether the PPDU is initially transmitted or is retransmitted, and incremental redundancy (IR) information related to the PPDU;
   decoding at least one PPDU for the STA in the A-PPDU based on the PHY header; and
   transmitting a second frame comprising acknowledgment/negative-acknowledgment (ACK/NACK) information related to each of the at least one PPDU for the STA based on a decoding result,
   wherein a cyclic redundancy check (CRC) is individually provided for each of the PPDUs comprised in the A-PPDU, and
   wherein the STA transmits, through the second frame, a NACK of a specific PPDU in which CRC failure occurs when performing the decoding.

2. The method of claim 1, wherein the first frame further comprises training symbols positioned before the PHY header and the A-PPDU, and
   wherein the training symbols are configured differently according to a number of STAs receiving the A-PPDU.

3. The method of claim 2, wherein the training symbols comprises an HARQ-long training field (LTF), and
   wherein the HARQ-LTF comprises a first HARQ-LTF for the STA and a second HARQ-LTF for a different STA.

4. The method of claim 3, wherein the first HARQ-LTF and the second HARQ-LTF are subjected to frequency-division multiplexing, and
   wherein the second HARQ-LTF is obtained by shifting the first HARQ-LTF by a specific subcarrier in a frequency domain.

5. The method of claim 1, wherein each of the PPDUs comprised in the A-PPDU corresponds to part of one PHY service data unit (PSDU).

6. A station (STA) for transmitting and receiving a frame in a wireless local area network (WLAN), the STA comprising:
   a transceiver; and
   a processor coupled to the transceiver, wherein the processor is configured to:
      receive a first frame comprising an aggregated-physical layer protocol data unit (A-PPDU) and a physical (PHY) header, wherein the A-PPDU is configured by aggregating PPDUs, and each of the PPDUs include a data unit related to a hybrid automatic repeat request (HARQ) process, and
      wherein the PHY header comprises at least one of a number of PPDUs comprised in the A-PPDU, an identifier of a receiving STA of each PPDU, and position or size information related to each PPDU,
      wherein the PHY header further comprises at least one of an HARQ process identifier of the PPDU, information related to whether the PPDU is initially transmitted or is retransmitted, and incremental redundancy (IR) information related to the PPDU;
      decode at least one PPDU for the STA in the A-PPDU based on the PHY header; and
      transmit a second frame comprising acknowledgment/negative-acknowledgment (ACK/NACK) information related to each of the at least one PPDU for the STA based on a decoding result,
      wherein a cyclic redundancy check (CRC) is individually provided for each of the PPDUs comprised in the A-PPDU, and
      wherein the STA transmits, through the second frame, a NACK of a specific PPDU in which CRC failure occurs when performing the decoding.

* * * * *